United States Patent [19]
Pagano et al.

[11] Patent Number: 5,893,654
[45] Date of Patent: Apr. 13, 1999

[54] STILL PICTURE CAMERA AND PHOTOGRAPHIC METHOD EMPLOYING MULTIPLE FILM CASSETTES

[75] Inventors: Daniel M. Pagano, Honeoye Falls; John Gasper, Hilton, both of N.Y.

[73] Assignee: Eastman Kodak Company, Rochester, N.Y.

[21] Appl. No.: 09/025,557

[22] Filed: Feb. 18, 1998

[51] Int. Cl.[6] .................................................. G03B 17/24
[52] U.S. Cl. ........................... 396/390; 396/446; 396/538
[58] Field of Search .................................. 396/390, 446, 396/2, 387, 406, 411, 418, 535, 538

[56] References Cited

U.S. PATENT DOCUMENTS

| | | |
|---|---|---|
| 2,439,112 | 4/1948 | Teague . |
| 2,507,926 | 4/1950 | Noble . |
| 2,616,342 | 11/1952 | Thompson . |
| 2,672,796 | 3/1954 | Incledon . |
| 3,034,412 | 5/1962 | Bohm et al. . |
| 3,805,277 | 4/1974 | Domnick . |
| 4,994,828 | 2/1991 | Smart . |
| 5,023,642 | 6/1991 | Pagano . |
| 5,209,419 | 5/1993 | Zander . |
| 5,231,438 | 7/1993 | Smart . |
| 5,258,789 | 11/1993 | Labaziewicz . |
| 5,357,301 | 10/1994 | Prosser . |
| 5,357,303 | 10/1994 | Wirt . |
| 5,552,848 | 9/1996 | Lawtner . |
| 5,555,048 | 9/1996 | Oldfield . |
| 5,614,976 | 3/1997 | Smart et al. . |

*Primary Examiner*—David M. Gray
*Attorney, Agent, or Firm*—Thomas H. Close

[57] ABSTRACT

A still picture camera for capturing images when film is alternately advanced from any one of three film cassettes into a common film gate for a controlled exposure by light passing through an objective lens and shutter, the camera comprising a camera body, an objective lens for forming an image, a shutter for controlled admission of light, a film gate for defining the area of exposure of one frame of photographic film, three film cassette chambers mounted in a rotating turret each accepting a film cassette, a turret rotation mechanism, a film advancement mechanism, and one film spooling chamber for alternately receiving film from any film cassette.

33 Claims, 18 Drawing Sheets

STILL PICTURE CAMERA AND PHOTOGRAPHIC METHOD EMPLOYING MULTIPLE FILM CASSETTES

CROSS-REFERENCE TO RELATED APPLICATIONS

The present application is related to U.S. Application Serial Number to be assigned, by John Gasper and Daniel M. Pagano, and entitled, "Still Picture Camera with Two Film Cassettes" (EK Docket 76,080).

FIELD OF THE INVENTION

The invention relates generally to the field of photography, and in particular to a still picture camera. More specifically, the invention relates to a camera that accepts more than two film cassettes, typically of different ISO film speeds.

BACKGROUND OF THE INVENTION

Photography, whether by the professional or amateur, is an art form wherein the photographer imparts his skills in selecting the subject, lighting, exposure, and choice of film. For example, the photographer may want a high speed black & white film for one subject but a slow, fine grain color film for another, or a color slide film and later a color-negative film, or more commonly a slow speed film to use under bright lighting conditions such as found outdoors and a high speed color-negative film for lower lighting conditions such as found indoors. It has therefore been necessary for the photographer to either carry two or more cameras each loaded with the appropriate film type or to use one camera loaded with different film types which requires unloading one film and replacing it with another. This is a time consuming process that at best delays the time of exposure by a few minutes or at worst causes a complete loss of the photo opportunity. Attempts have been made in the past to build cameras that accepted more than one roll or cassette of film. For example, U.S. Pat. Nos. 2,439,112; 2,616,342; 2,672,796; 3,034,412; 3,805,277 and 5,357,301 all describe cameras with a single objective lens but two pressure plates, supply spools, and take-up spools. Various methods, some rather complex, are described for changing exposure from one film supply to the other, such as by mechanical or optical means. U.S. Pat. No. 2,507,926 describes a camera with a single objective lens capable of exposing multiple films from multiple pressure plates, supply spools, and take-up spools.

Cameras currently being manufactured hold only one film cassette with a fixed number of exposures. In a new line of Advanced Photo System (APS) cameras the more expensive cameras have a feature called mid-roll interrupt. This feature allows the user to remove a film cassette prior to exposing all frames. When this same cassette is reinserted into the camera at a later time, the film is automatically thrust from the cassette and advanced into the film gate to expose the next unexposed frame. This operation requires that the camera have a magnetic read/write head. The APS film has a thin layer of a magnetic recording medium coated on the film base to which the magnetic head can read and write the necessary information that enables mid-roll interrupt. As the lighting conditions change or the photographer moves between indoor and outdoor photography, there is a need to take pictures with film having an ISO speed optimally matched to the changing lighting conditions. In order to expose film with an ISO speed different from that of the film in the camera, it is first necessary to rewind and remove the cassette presently in the camera and then load the camera with a cassette of different film speed. It is therefore necessary for the photographer to have available a second film cassette of the appropriate film speed at the moment when it is the preferred film to use. Most likely this second film cassette will not be available because people do not plan ahead and do not like to carry film in a pocket, purse, or camera bag. If the second cassette is not available at the required moment then the photo opportunity is either lost or the exposure is made with film of the incorrect speed, thereby producing a photographic print of non-optimal image quality. Even when another film cassette is available for this exchange, the amount of time required to perform the exchange is minutes rather than seconds by which time the photo-opportunity may be lost. Prints of non-optimal image quality are typically either grainy, too light or too dark, or lack proper contrast. The lower-cost cameras do not offer the mid-roll interrupt feature. After loading film into the lower-cost cameras, the cassette chamber door is locked and cannot be opened until all frames are exposed or the user elects to remove the film prior to exposing all frames, in which case the remaining frames can never be exposed. There is a need therefore for an improved photographic camera capable of handling multiple cassettes.

SUMMARY OF THE INVENTION

The present invention is directed to overcoming one or more of the problems set forth above. Briefly summarized, according to one aspect of the present invention, a camera provides mid-roll interrupt by storing multiple film cassettes in multiple chambers in a turret and selecting at any time the optimal film to advance into a single film gate from any of the plurality of film cassettes according to the lighting conditions without the need of a magnetic read/write head. Only one take-up chamber is required in which to spool the film as it is advanced through the film gate.

The present invention therefore provides a still picture camera for capturing images when film is alternately advanced from any one of a plurality of film cassettes into a common film gate for a controlled exposure by light passing through an objective lens and shutter, the camera comprising a camera body, an objective lens for forming an image, a shutter for controlled admission of light, a film gate for defining the area of exposure of one frame of photographic film, multiple film cassette chambers mounted in a rotatable turret and each chamber accepting a film cassette, a turret rotation mechanism, a film advancement mechanism, and one film spooling chamber for alternately receiving film from any film cassette.

Another object of the present invention is to provide a lighttight and lockable single-chamber film-loading door to enable the camera to specify which of the plurality of film chambers to load or unload.

Another object of the present invention is to provide two lighttight and lockable single-chamber doors to enable loading and unloading one or two film chambers.

Yet another object of the present invention is to provide one lighttight and lockable three-chamber door to enable loading and unloading one, two, or three film chambers.

A further object of the present invention is to provide mid-roll interrupt in a camera that does not require a magnetic read/write head.

Still another object of the present invention is to provide a central processing unit to control operation of the camera.

Yet another object of the present invention is to provide a still picture camera that provides a minimal number of film changes by judicious employment of electronic flash.

Another object of the present invention is to provide to the user a greater number of film exposures prior to reloading the camera.

Still another object of the present invention is to provide to the user a greater number of prints of superior image quality than offered by present cameras.

Yet another object of the present invention is to provide the photographer with greater number of picture taking opportunities.

Lastly, the camera of the present invention can be used with multiple film cassettes with each cassette having a minimum number of exposures without sacrificing total number of exposures and providing to the user the advantage of getting the film processed and printed sooner.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention provides to the photographer a compact and intelligent camera capable of automatically selecting and exposing film of the correct film speed over a much wider range of lighting conditions than heretofore possible. The quality of the photographic prints is greatly improved by avoiding situations of under-exposure and over-exposure that arise when the film loaded in the camera is of the wrong film speed for the lighting conditions. The camera of the present invention is also able to take more pictures before requiring reloading than cameras of the prior art as well as deliver prints to the customer in a more timely fashion.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
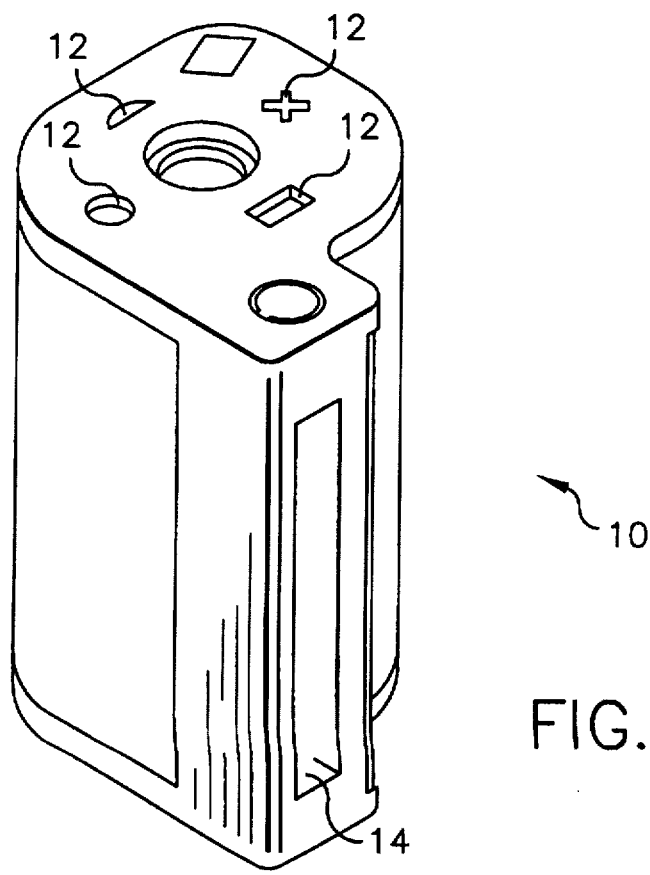
FIG. 1 is a perspective view showing one end and sides of a film cassette.
Figure 2:
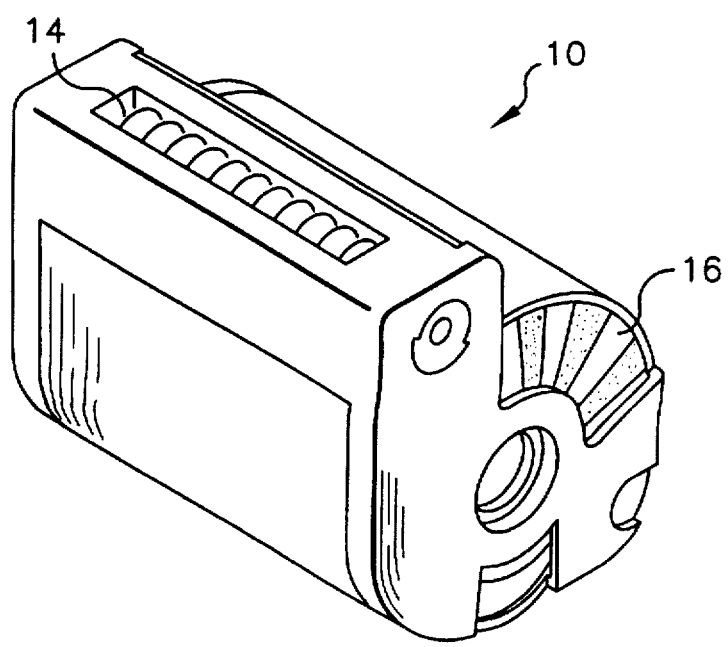
FIG. 2 is a perspective view showing other end and sides of a film cassette.

A preferred embodiment of a still picture camera of the present invention will now be described. The camera is loaded with film by accepting standard thrust type film cassettes. FIG. 1 shows in perspective view one end and sides of a film cassette 10. The status of film exposure can be viewed prior to using the cassette by looking at the film status indicators 12 at one end of the cassette as shown. After loading a film cassette into a cassette chamber and closing a lighttight and lockable chamber door, a microprocessor or central processing unit (CPU) 31 (see FIG. 3) initiates the opening of a light lock door 14 is opened and the reading of a data disk 16 (FIG. 2) to record in the CPU 31 the film speed and number of frames provided for exposure. Further details of the operation of APS cameras and cassettes are provided, respectively, in selected U.S. Pat. Nos. 4,994,828; 5,023, 642; 5,231,438; 5,552,848 and 5,555,048 and selected U.S. Pat. Nos. 5,209,419; 5,258,789; 5,357,303 and 5,614,976 and these details will not be discussed here.

Figure 3:
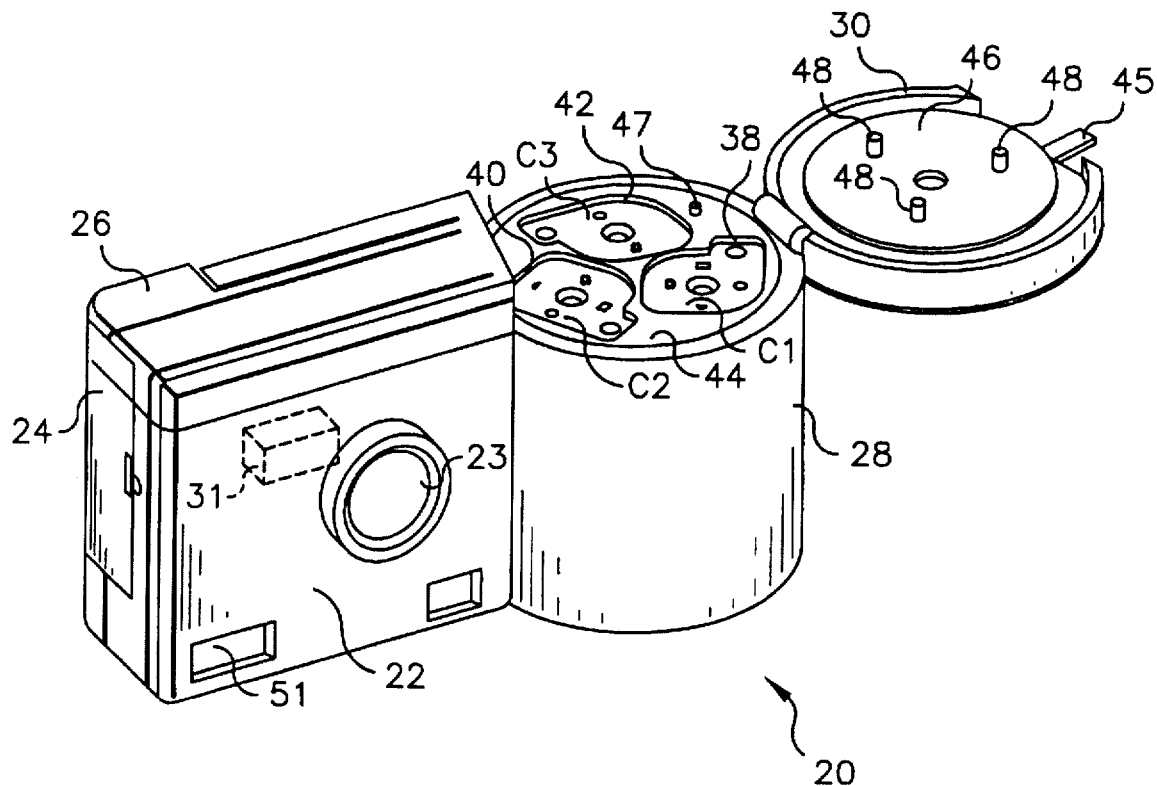
FIG. 3 is a perspective view of a camera of the present invention with a single chamber door that opens by a hinge for loading three cassettes into three chambers contained in a revolving turret.

A preferred embodiment of a camera of the present invention is shown in perspective view if FIG. 3. The figure shows the front 22, side 24, underside 26, and turret housing 28 of a still picture camera with one three-chamber door 30 in the open position. Three film cassettes designated as cassette C1, cassette C2, and cassette C3 are shown loaded into, respectively, cassette C1 chamber 38, cassette C2 chamber 40, and cassette C3 chamber 42. All three chambers are contained within a revolving turret 44. A rotatable disk 46 attached to the inside of door 30 supports three spool centering pins 48 that maintain centering of the film spools in each of the three film cassettes when lighttight and lockable single three-chamber door 30 is closed. A door latch 45 is provided on chamber door 30, for latching the chamber door closed. The door latch 45 is controlled by CPU 31, which can override an attempt to manually open the latch when there is film extending from one of the cassettes into the camera. After one or more of the cassette chambers and closing the chamber door, the door is locked and will not open until the film in all of the cassettes has been rewound into the cassettes and the light lock doors on the cassettes have been closed. The chamber that happens to be in position for thrusting film into the film gate (chamber 42 in FIG. 3) will be referred to as the "feed chamber". After loading all three film cassettes into the chambers and closing the chamber door 30, the data disk 16 at one end of the cassette in the feed chamber is read to record the ISO film speed and number of frames provided for exposure by a data disk reader 43 (see FIGS. 11, 12). Sequentially, under control of the CPU 31, the turret 44 is rotated to permit reading the data disk of each of the film cassettes so the ISO film speed and number of frames of exposure provided by each cassette is stored in the microprocessor. The camera 20 is also provided with a visual display such as a liquid crystal display (LCD) 54 (see FIGS. 11, 12) to show the user the present status of the film cassettes loaded into the chambers 38, 40, and 42.

Figure 4:
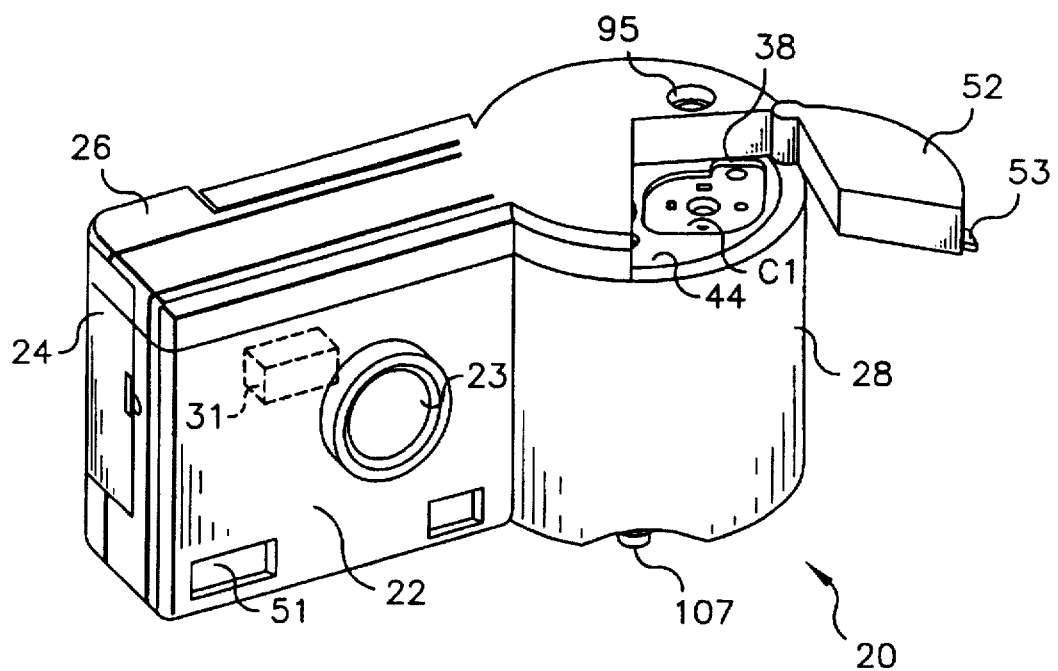
FIG. 4 is a perspective view of a camera with a single chamber door that swivels on a hinge to enable loading a single cassette into one of three chambers contained in a revolving turret.

An alternative embodiment of a camera of the present invention is shown in perspective view in FIG. 4. The figure shows the front 22, side 24, underside 26, and turret housing 28 of a still picture camera with a single-chamber door 52 shown in the open position. Cassette C1 is shown loaded into cassette chamber 38 of the revolving turret 44, which similar to the camera shown in FIG. 3, contains three chambers. After loading film into cassette chamber 38, the CPU causes the turret 44 to rotate to enable loading sequentially the remaining two chambers, 40 and 42 (not shown). After loading all chambers and closing the single-chamber door 52, the single-chamber door is locked by a latch 53. Latch 53 is under control of CPU 31 and cannot be actuated when there is the possibility of exposing film in the camera. After loading all three film cassettes into the chambers and closing the chamber door 52, the data disk 16 of the cassette in the feed chamber is read to record in the CPU the ISO film speed and number of frames provided for exposure. Sequentially the turret is rotated to permit reading the data disk of the remaining film cassettes so the ISO film speed and number of frames of exposure provided by each cassette is stored in the microprocessor. This camera also has a visual display 54 (see FIGS. 11, 12) such as an LCD to show the user the present status of the film cassettes loaded into the chambers.

Figure 5:
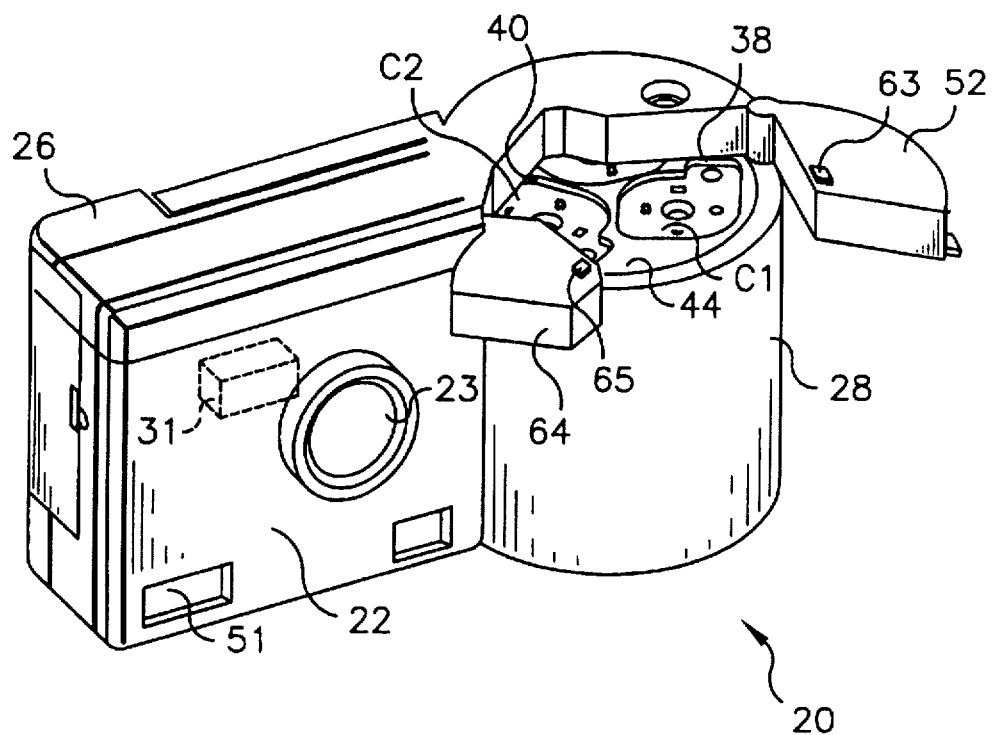
FIG. 5 is a perspective view of a camera of the present invention with two chamber doors that each swivel on hinges to enable loading two cassettes into two of three chambers contained in a revolving turret.

Another alternative embodiment of a camera of the present invention is shown in perspective view in FIG. 5. The figure shows the front 22, underside 26, and turret housing 28 of a still picture camera 20 with two single-chamber doors 52 and 64. The chamber doors 52 and 64 are pivotally mounted to swing in opposite directions to open and close. Cassette C1 is loaded into chamber 38 and cassette C2 is loaded into chamber 40. After loading film into the two chambers, the turret 44 is commanded by the CPU 31 to rotate to enable loading the remaining chamber 42 (not shown in FIG. 5). After loading all chambers and closing the two single-chamber doors 52 and 64, both single-chamber doors are latched shut by a door latches 63 and 65 respectively. Door latches 63 and 65 are under the control of CPU 31 and cannot be actuated when there is the possibility of exposing film in the camera by opening the doors. After loading all three film cassettes into the chambers and closing the two single-chamber doors 52 and 64, the data disk at one end of the cassette in the feed chamber is read to record the ISO film speed and number of frames provided for exposure. Sequentially the turret is rotated to permit reading the data disk of the remaining film cassettes so the ISO film speed and number of frames of exposure provided by each cassette is stored in the CPU 31. This camera also has a visual display such as an LCD 54 (see FIG. 11) to show the user the present status of the film cassettes loaded into the chambers.

Figure 6:
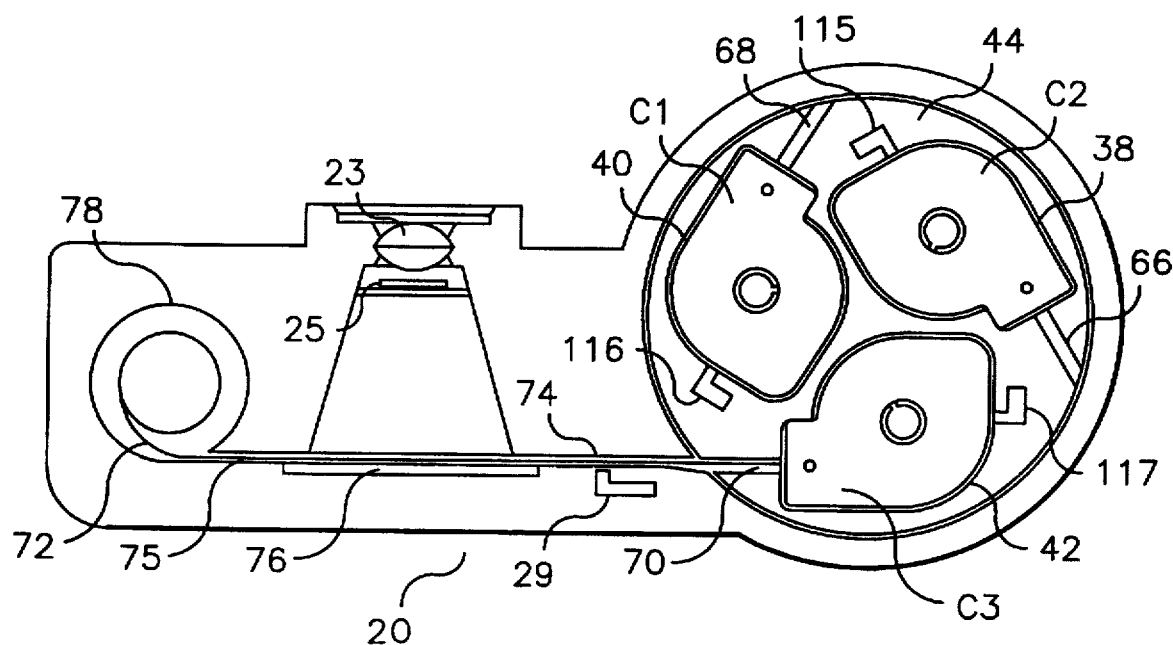
FIG. 6 is sectional view of the camera of the present invention. The camera has a revolving turret containing three chambers for accepting three film cassettes with film from one of the cassettes loaded into the film gate.

FIG. 6 is sectional view of the camera 20 of the present invention, in any of the embodiments discussed above, showing a turret 44 containing three cassette chambers 38, 40, and 42 loaded with three film cassettes C1, C2, and C3, respectively. Film 72 from cassette C3 loaded into chamber 42, presently the "feed chamber", is shown thrust into film channels 70 and 74, film gate 76, and extends into film channel 75 and spool chamber 78. Film channels 66, 68, and 70 are provided in revolving turret 44 to guide film from each cassette to the stationary film channel 74 that is provided in the camera body to guide film to the film gate 76. An image of a scene is formed on the film 72 in film gate 76 by a objective lens 23 when a shutter 25 is actuated. FIG. 6 also shows cassette sensors 115, 116, and 117 which sense the presence or absence of a cassette in the respective chambers. Cassette sensors 115, 116 and 117 are used in the embodiment shown in FIG. 3, which has a door 30 that covers all three chambers.

Figure 7:
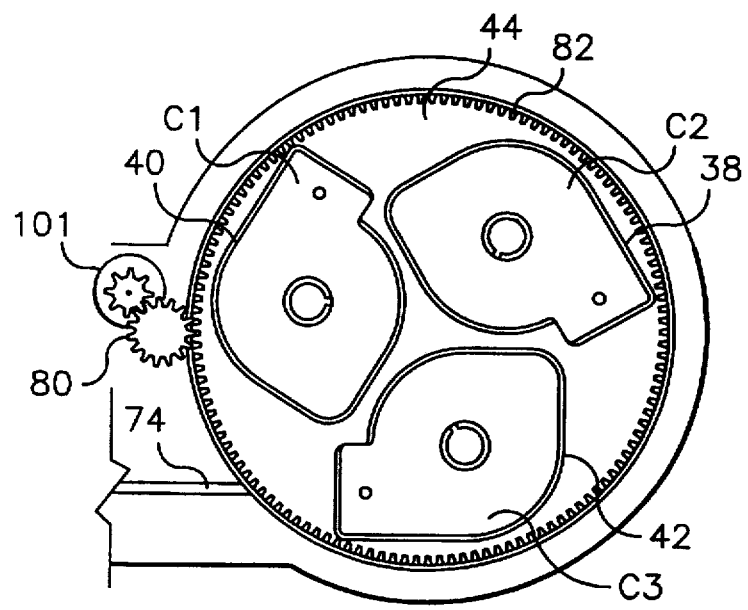
FIG. 7 shows a spur gear and turret gear for rotating the turret.

FIG. 7 shows details of a spur gear 80 and turret gear 82 engaged for rotating the turret 44. These gears are located at the top of the turret so as to not impede film discharge (see FIGS. 11 and 12). A turret motor 101 (see FIG. 6) is a stepper motor that drives spur gear 80 to enable turret rotation under control of CPU 31.

Figure 8:
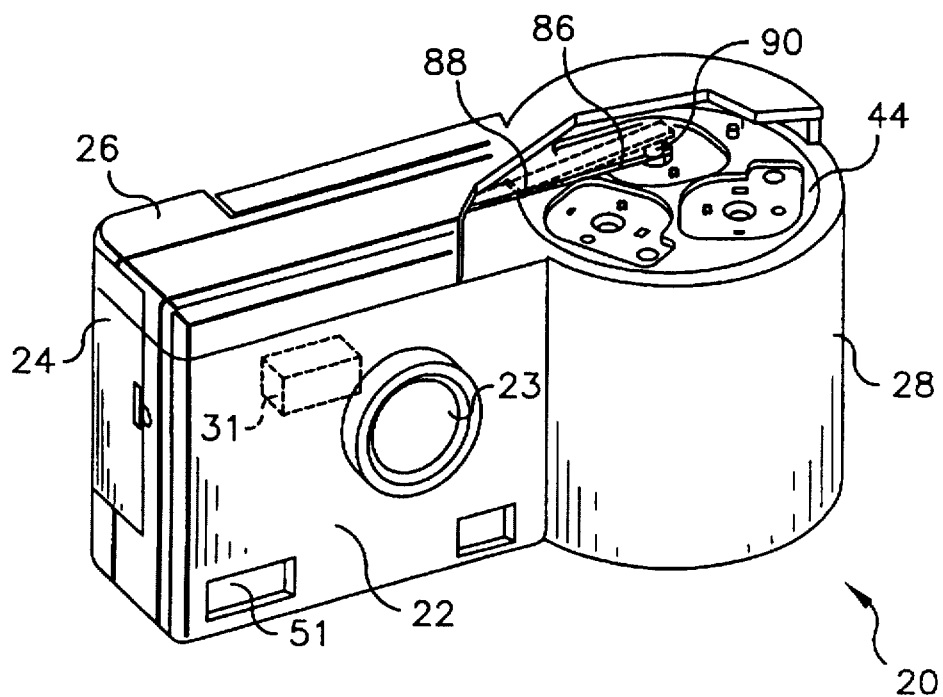
FIG. 8 is a perspective view of a cut-away of the underside of the camera showing a lever for engaging and disengaging (in phantom) a spool centering pin.

FIG. 8 is a perspective view of the front 22, side 24, and bottom 26 of a still picture camera 20 of the type shown in FIGS. 4 and 5 having individual film cassette chamber doors. These cameras do not have spool centering pins attached to the doors because the centering pins would interfere with rotation of the turret 44, and are only needed when film is being thrust from the cassette. A cut-away shows a lever 86 attached to pivot 88 and with lever 86 having at one end a spool centering pin 90. When the lever 86 is in the position shown by solid lines, the spool centering pin 90 engages one end of the spool of the cassette in the feed chamber to provide precise centering for accurate thrusting of film from or rewinding film into the cassette in the feed chamber. A phantom view shows the position of the lever and spool centering pin when disengaged from the cassette to allow rotation of turret 44. A solenoid (not shown) under control of the CPU 31 is connected to raise and lower the lever 86.

Figure 9:
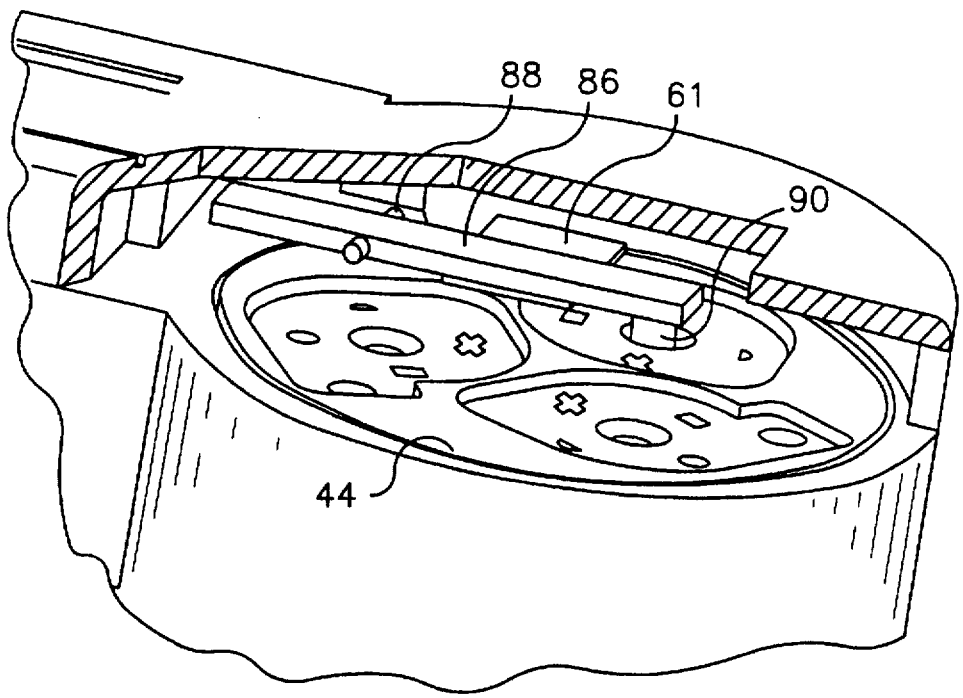
FIG. 9 is an enlarged perspective view of a cut-away of the underside of the camera showing a lever for engaging a spool centering pin.

FIG. 9 is enlarged perspective view of a cut-away of the bottom of the camera, showing lever 86, pivot 88, and spool centering pin 90. Lever 86 has been lowered to engage spool centering pin 90 into the end of the spool of the cassette presently loaded in the feed chamber. A light baffle 61 is attached to the underside of lever 86, and serves to block light from entering the cassette chamber that is in the "feed chamber" position when the chamber door (64 or 52) is opened. When there is film in the camera, CPU 31 insures that lever 86 is in the lowered position before the latches on the chamber doors can be actuated.

Figure 10:
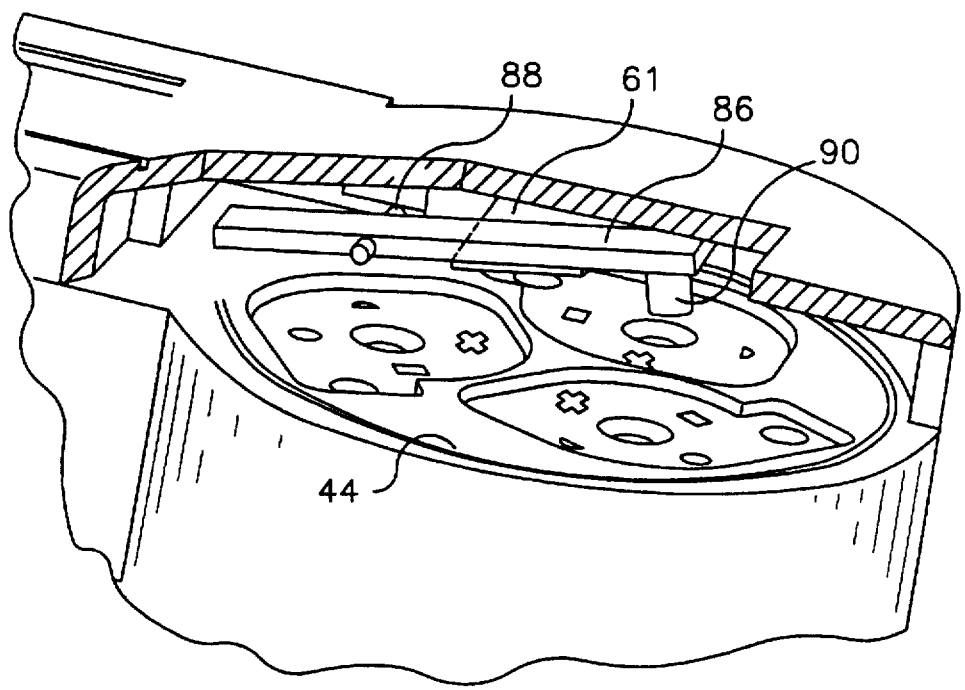
FIG. 10 is an enlarged perspective view of a cut-away of the underside of the camera showing a lever for disengaging a spool centering pin.

FIG. 10 is similar to FIG. 9 and shows the lever 86 in the raised position with light baffle 61 in an inoperative position with respect to the cassette chamber that is in the "feed chamber" position.

Figure 11:
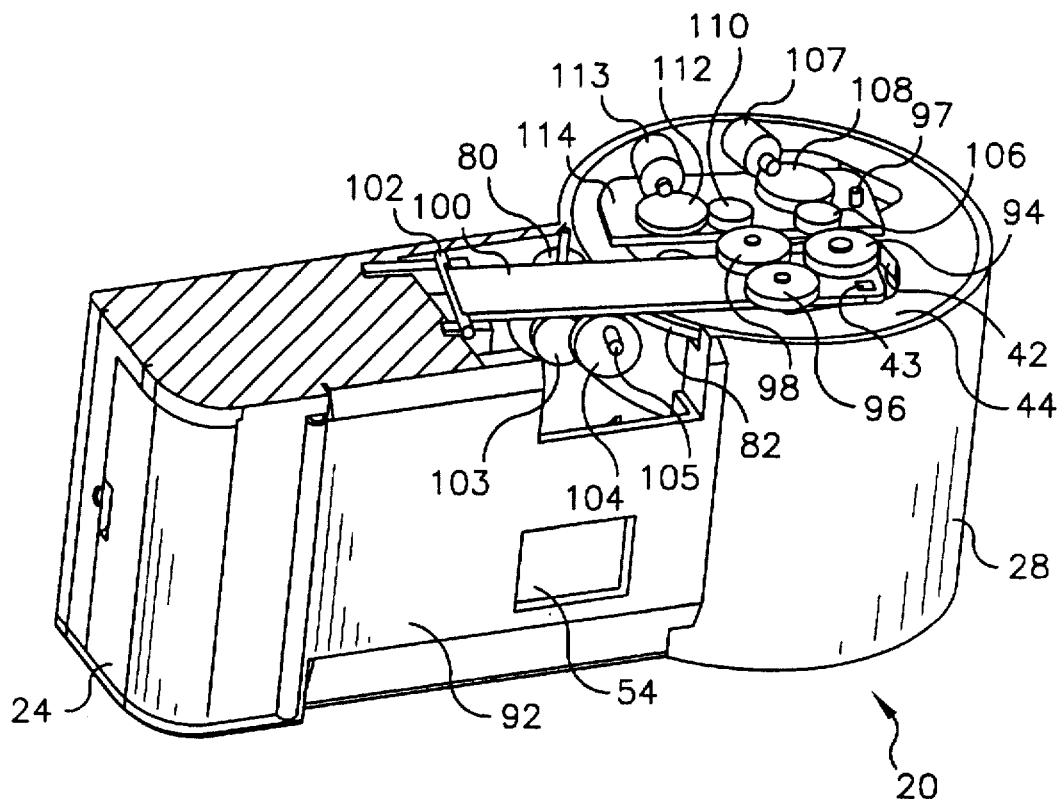
FIG. 11 is a perspective view of a cut-away of the top of the camera showing a cam actuator having engaged the spool and light lock drivers of the feed chamber.

FIG. 11 is a perspective view of the back 92, side 24, and a cut-away of the top of a still picture camera 20 according to the present invention. Camera 20 includes a spool driver 94 and light lock door driver 96 mounted on a pivot arm 100 for driving the spool and opening and closing the light lock of a cassette in the feed chamber 42. A cam 104, rotating on cam shaft 105, driven by a motor 103, governs the raising and lowering of pivot arm 100, about its pivot 102. Spool driver 94, light lock driver 96, and a transfer gear 98 are attached to pivot arm 100 and engage with the spool and light lock door mechanism of the cassette in feed chamber 42 when in the lowered position shown in FIG. 11. In the position shown in FIG. 11, spool driver 94 is in contact with a transfer gear 106 which is in contact with a motor driven gear 108, both gears 106 and 108 are mounted to a stationary plate 114. The motor 107 for driving gear 108 is responsible for thrusting film from the cassette and rewinding film into the cassette residing in the feed chamber 42 under control of the CPU 31. Transfer gear 110 in contact with a motor driven gear 112 are also attached to mechanism plate 114. Gear 112, driven by motor 113, is responsible for opening and closing the light lock door 14 of the cassette in the feed chamber 42.

Figure 12:
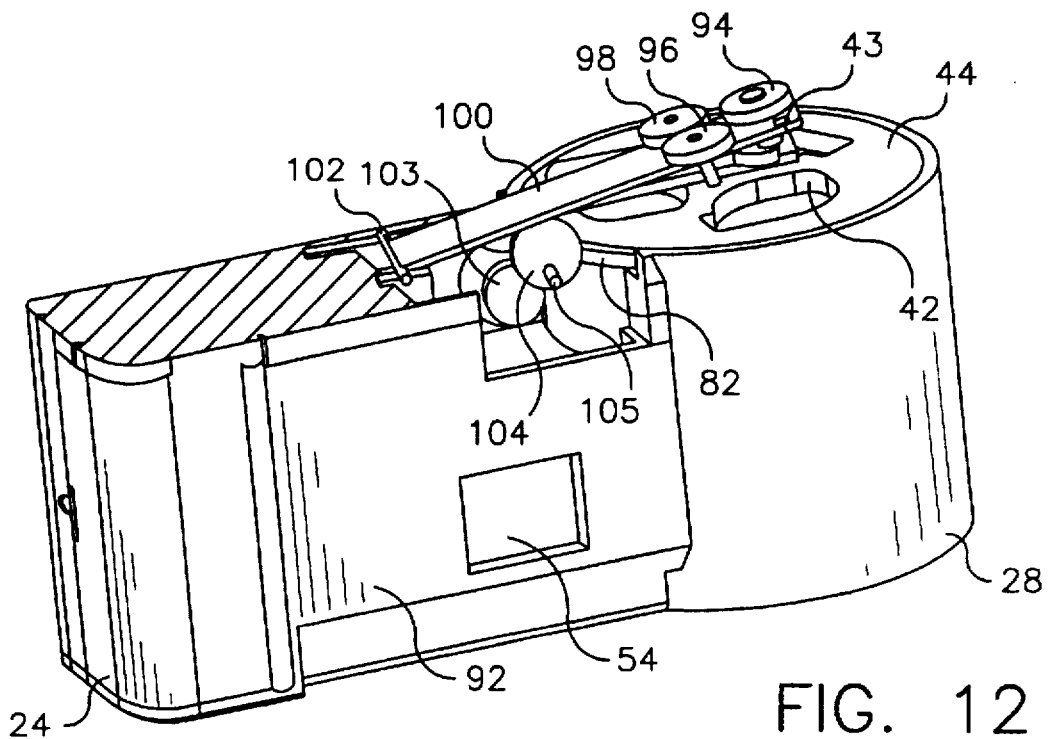
FIG. 12 is a perspective view of a cut-away of the top of the camera showing a cam actuator having disengaged the spool and light lock drivers of the feed chamber.
Figure 13A:
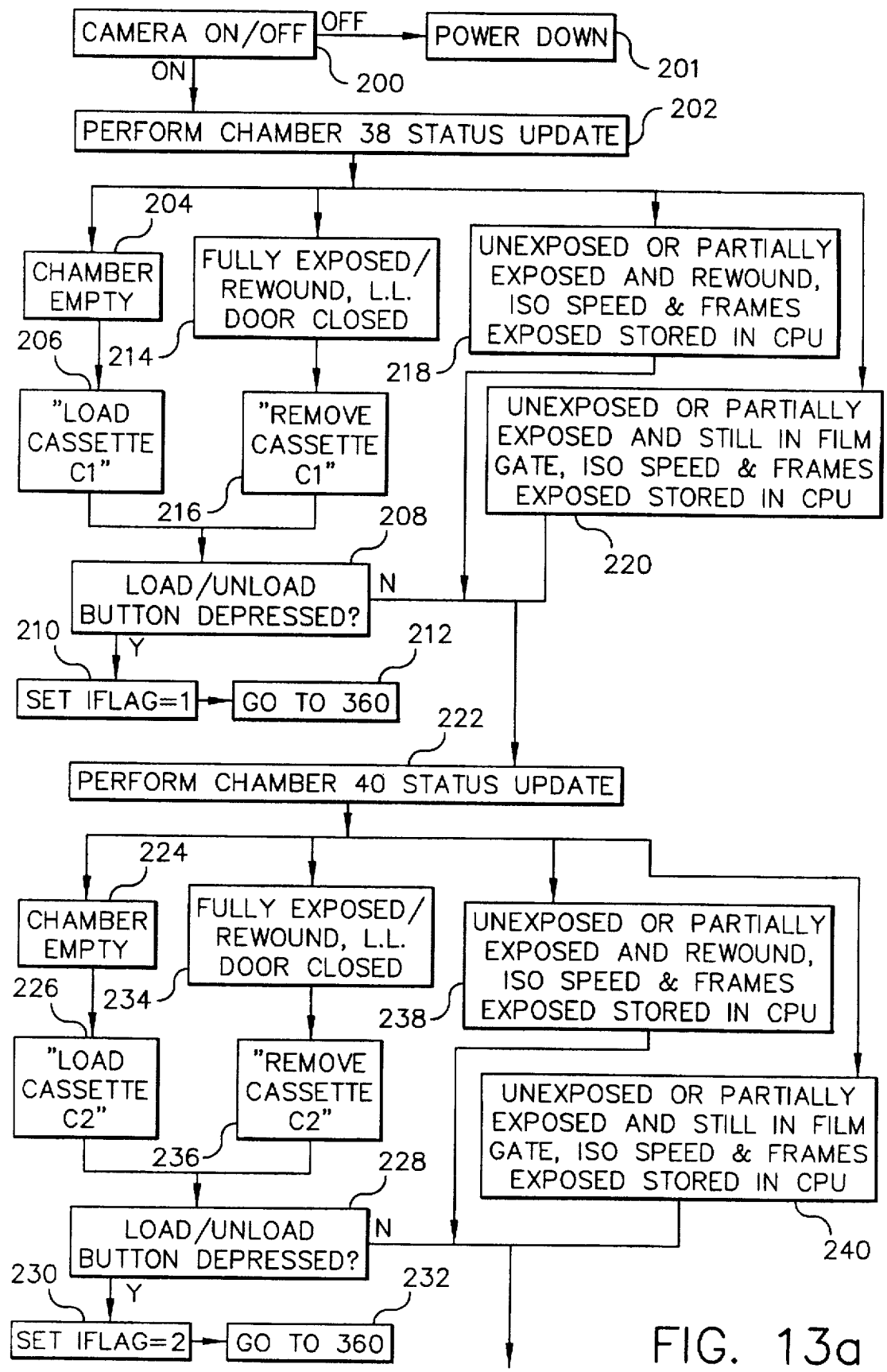
FIG. 13 is a typical flow chart for the basic operation of a three cassette camera with one single-chamber door when the priority of operation is to minimize the number of film changes while employing electronic flash when required.
Figure 13B:
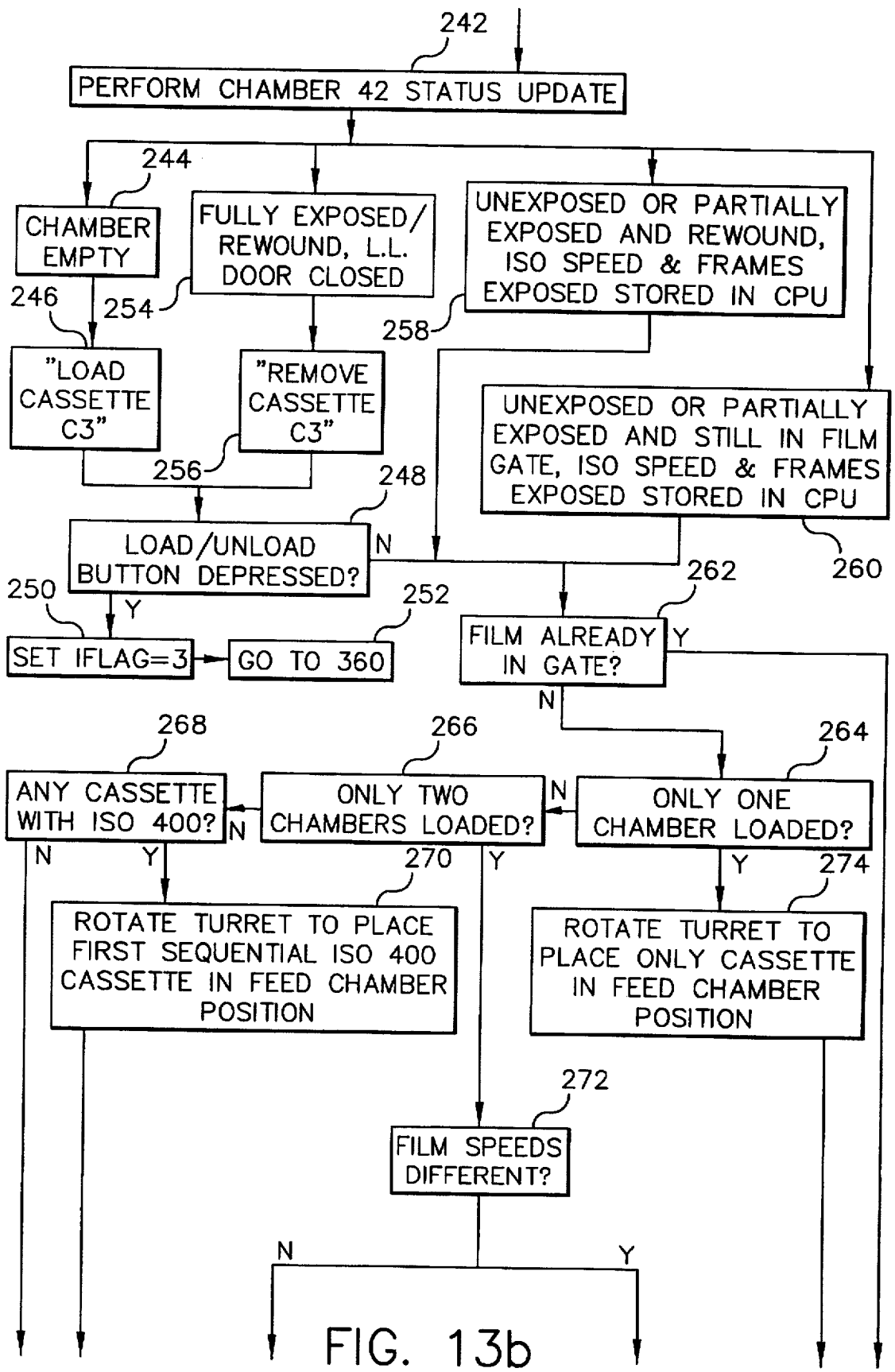
Figure 13C:
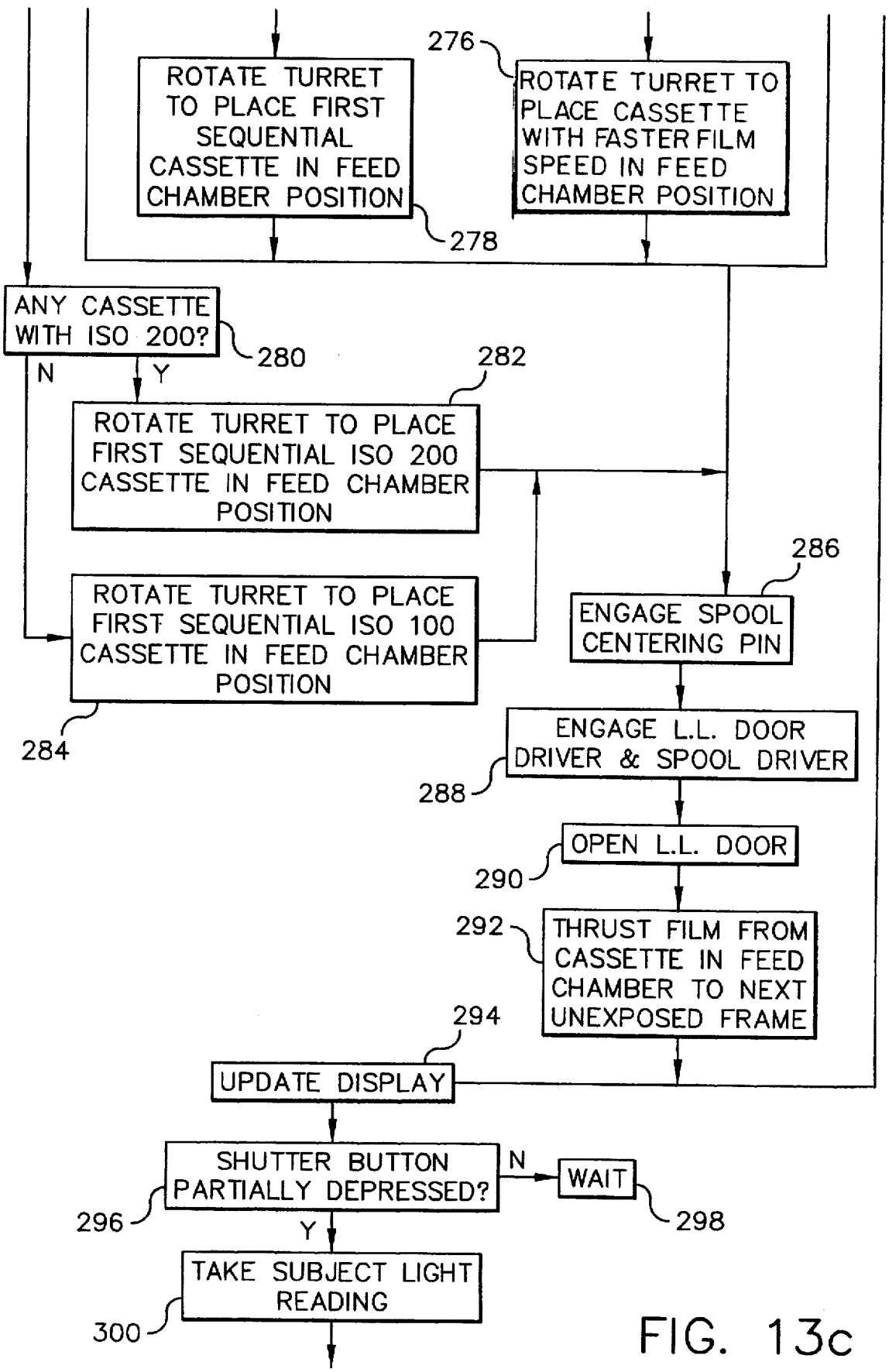
Figure 13D:
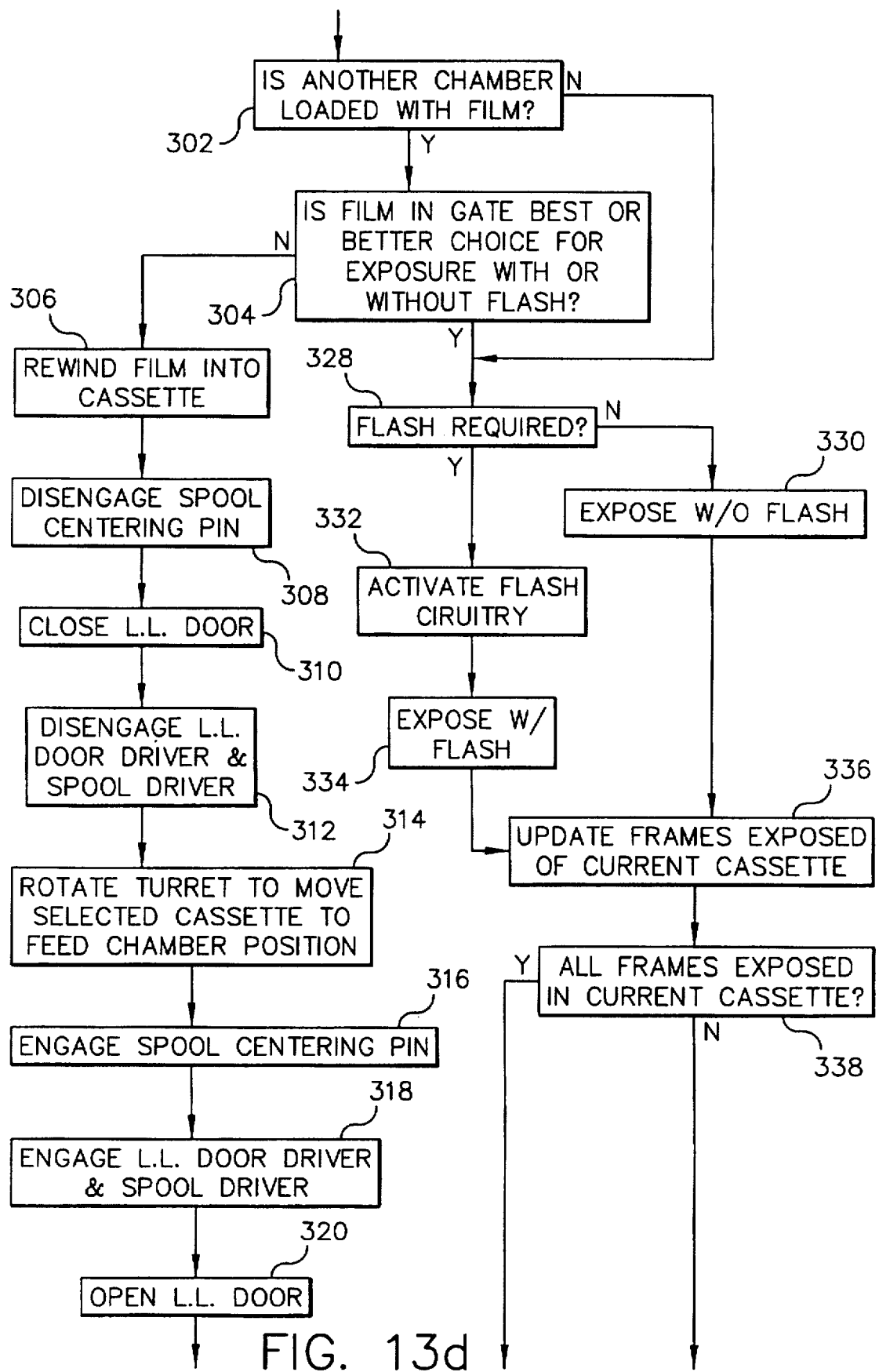
Figure 13E:
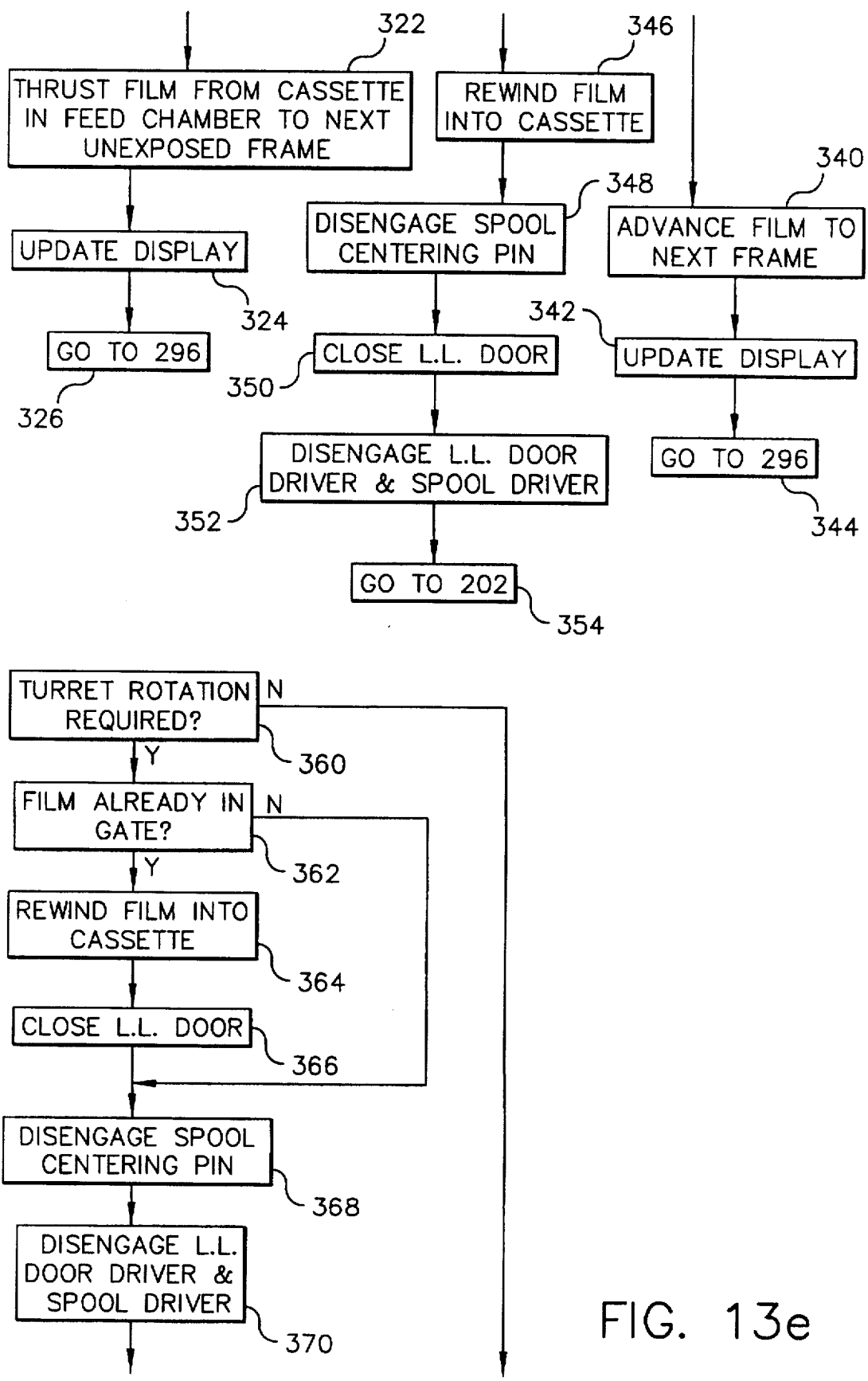
Figure 13F:
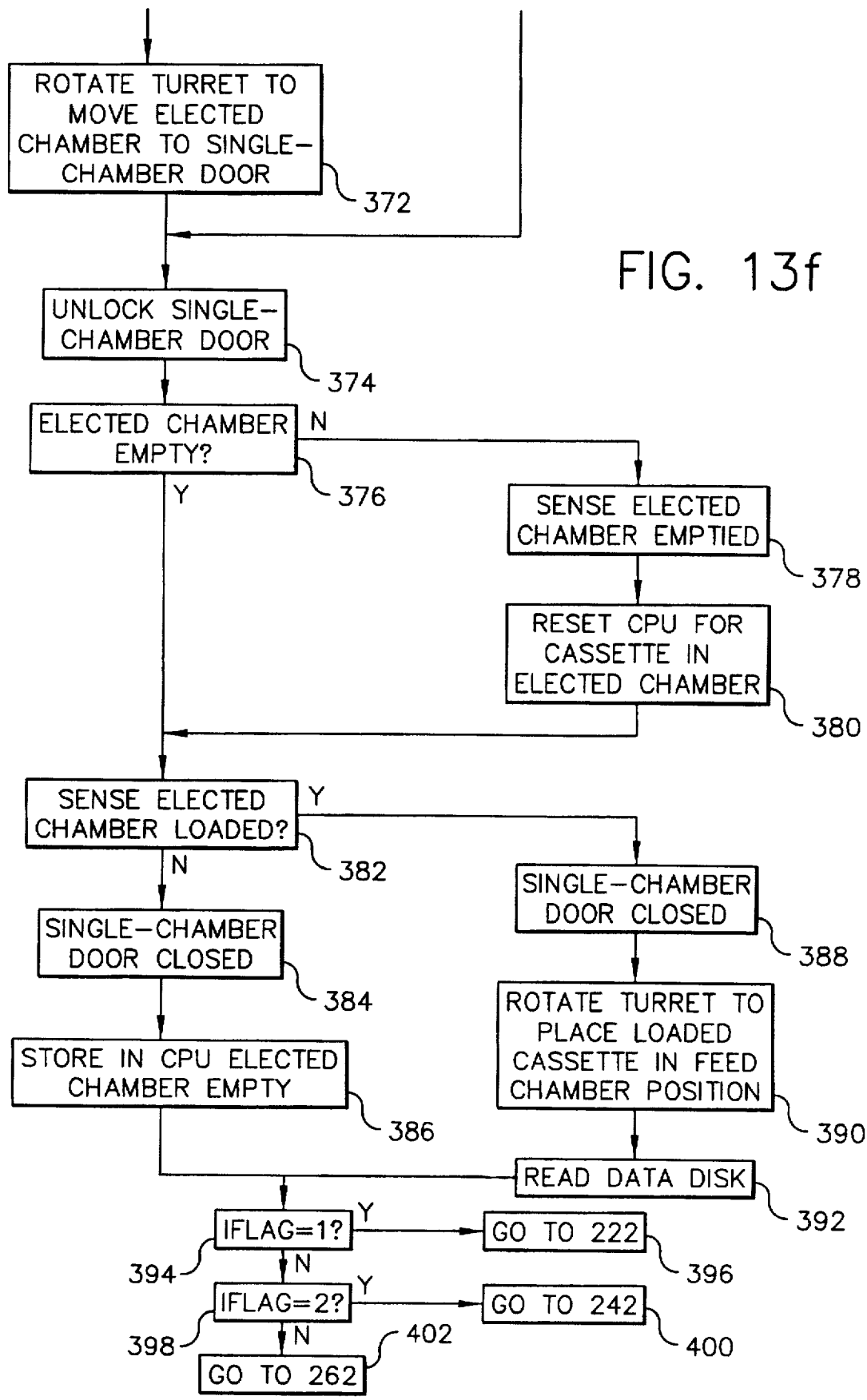
Figure 14A:
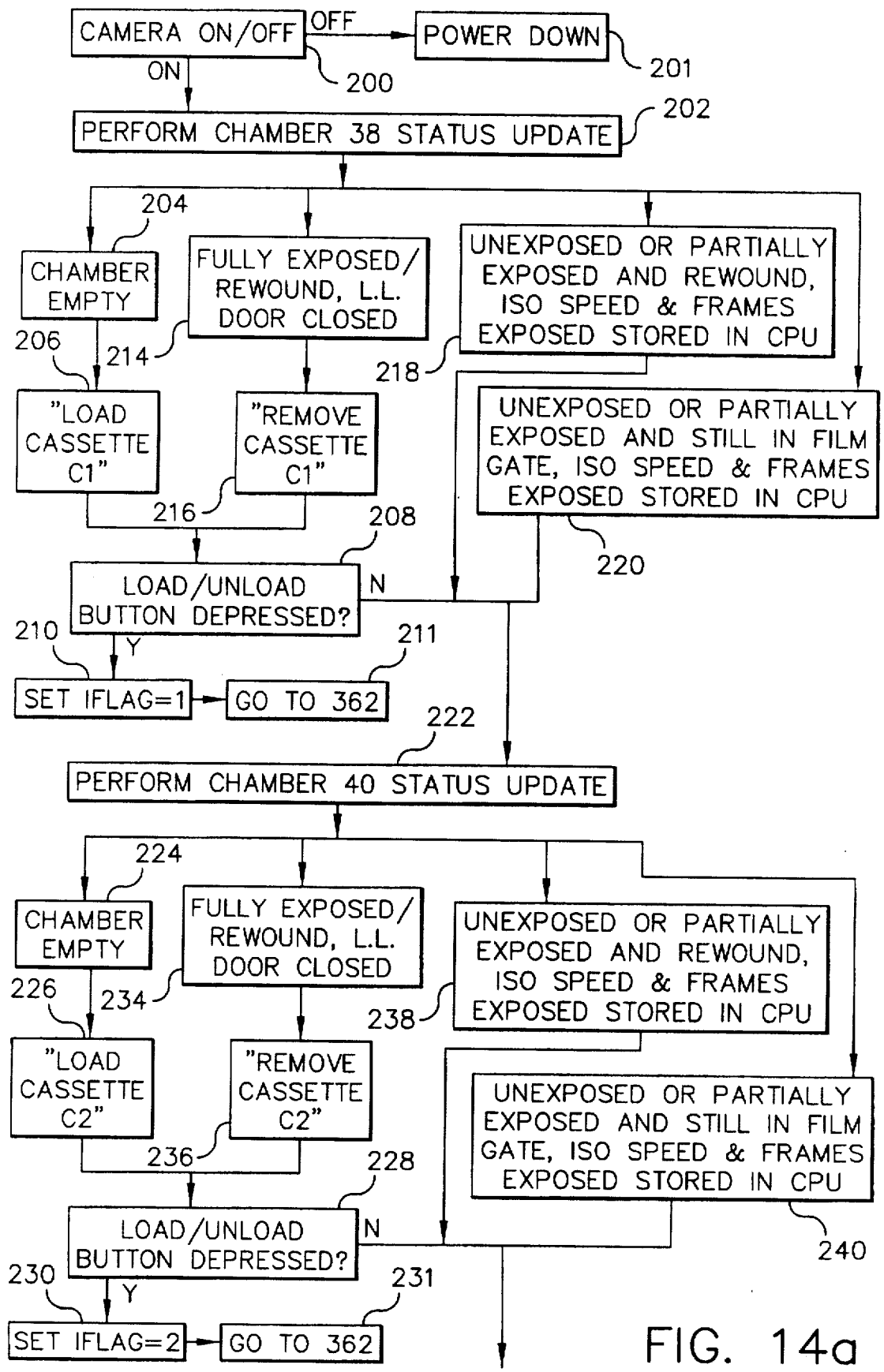
FIG. 14 is a typical flow chart for the basic operation of a three cassette camera with one three-chamber door when the priority of operation is to minimize the number of film changes while employing electronic flash when required.
Figure 14B:
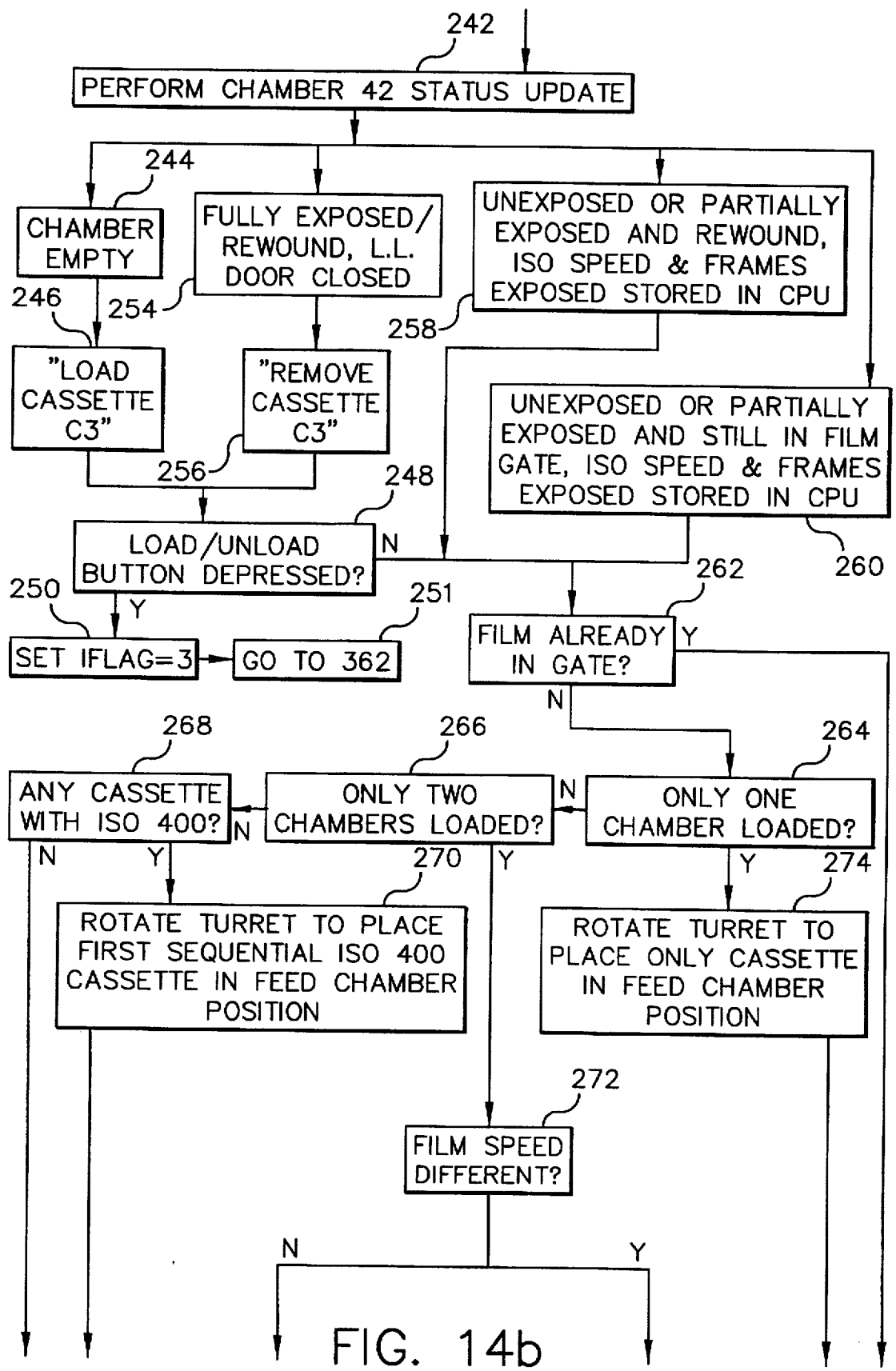
Figure 14C:
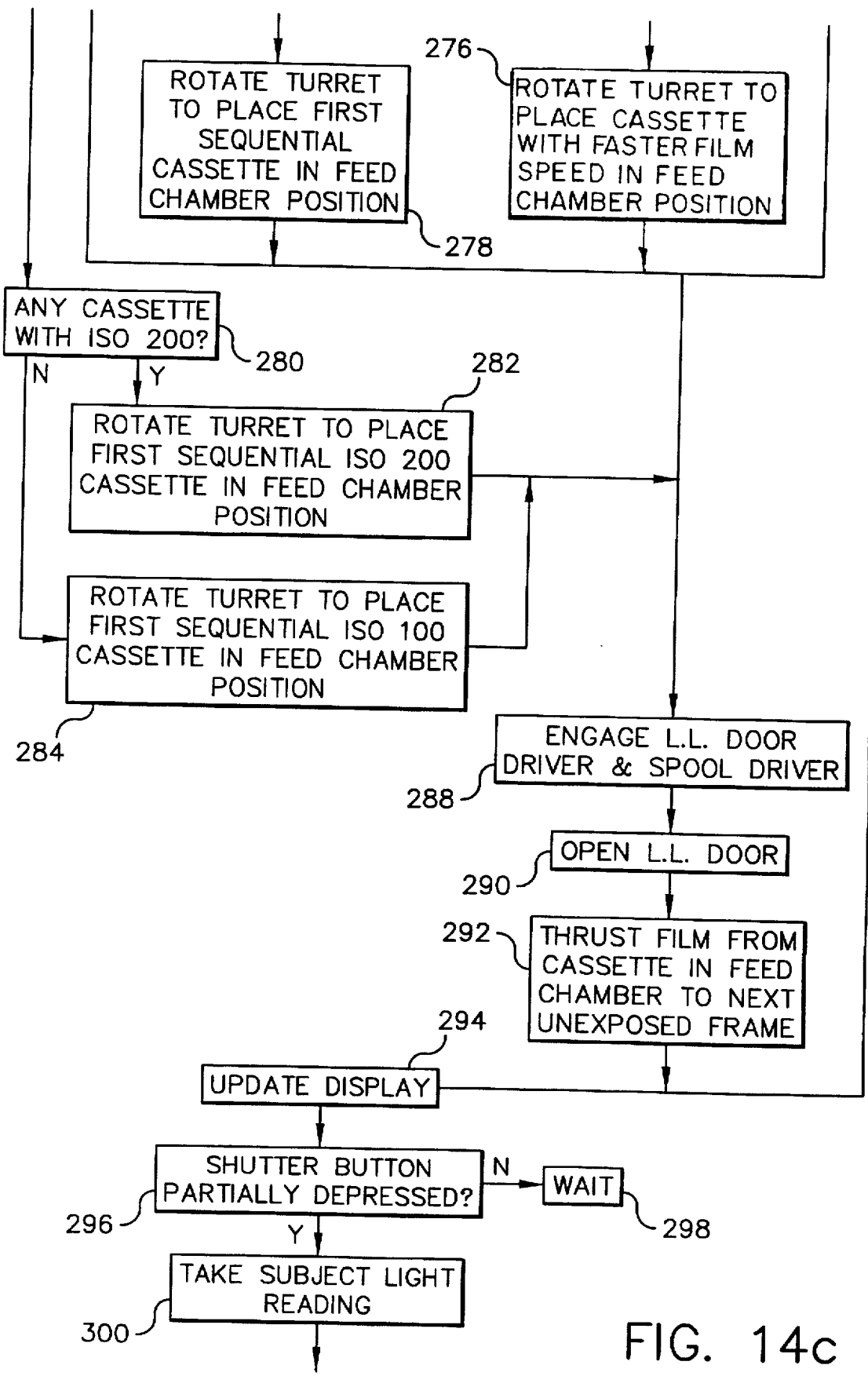
Figure 14D:
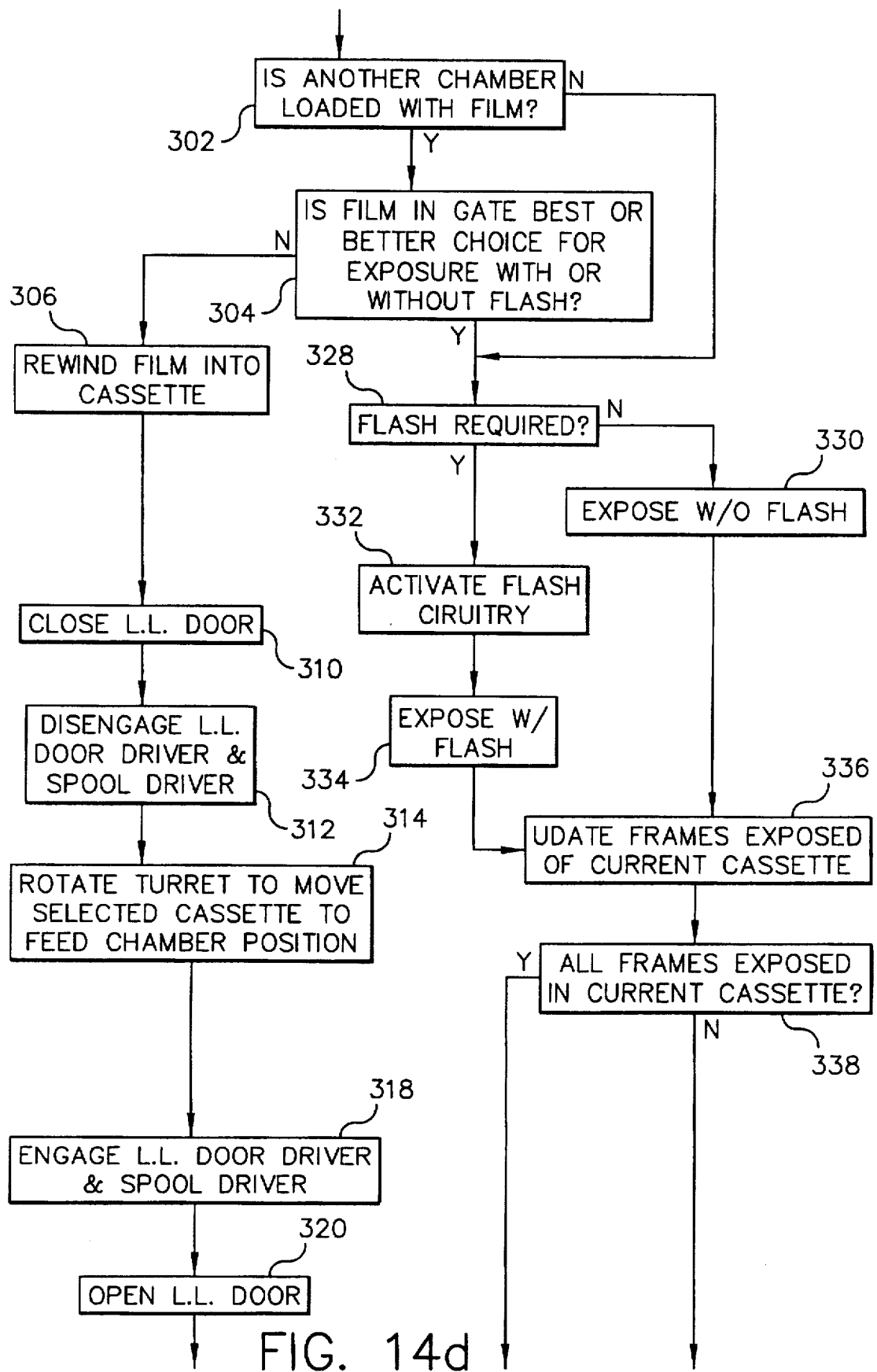
Figure 14E:
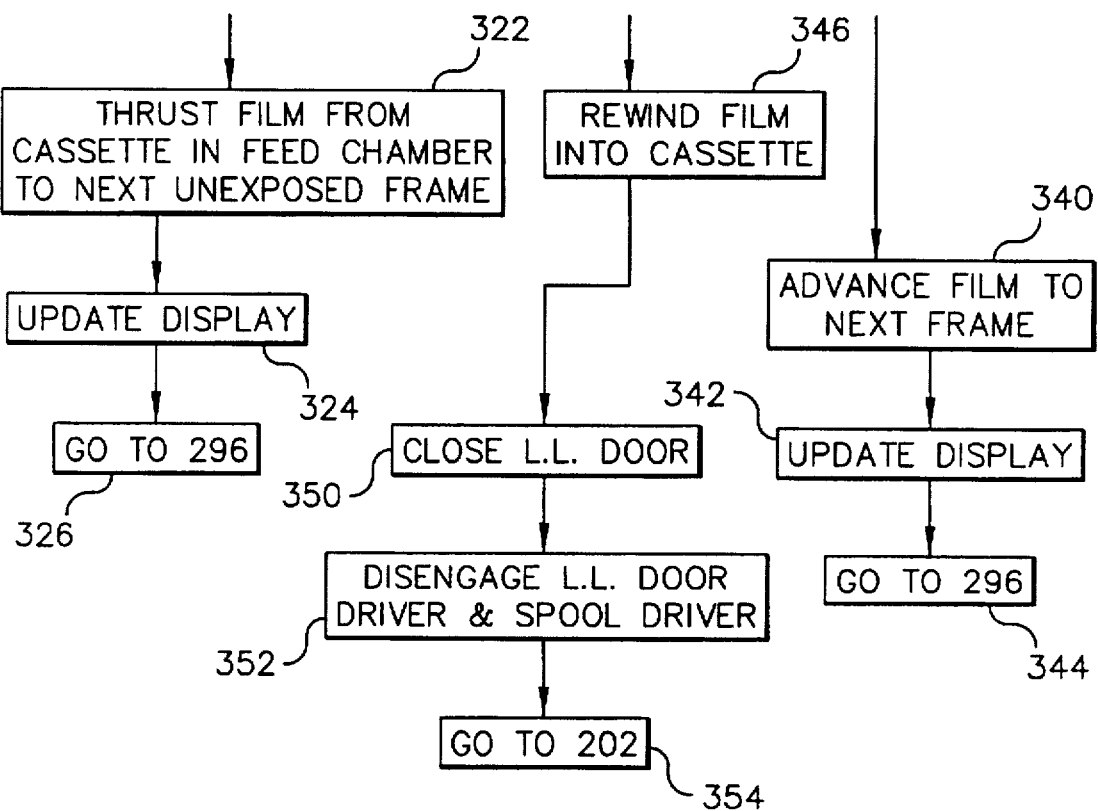
Figure 14E:
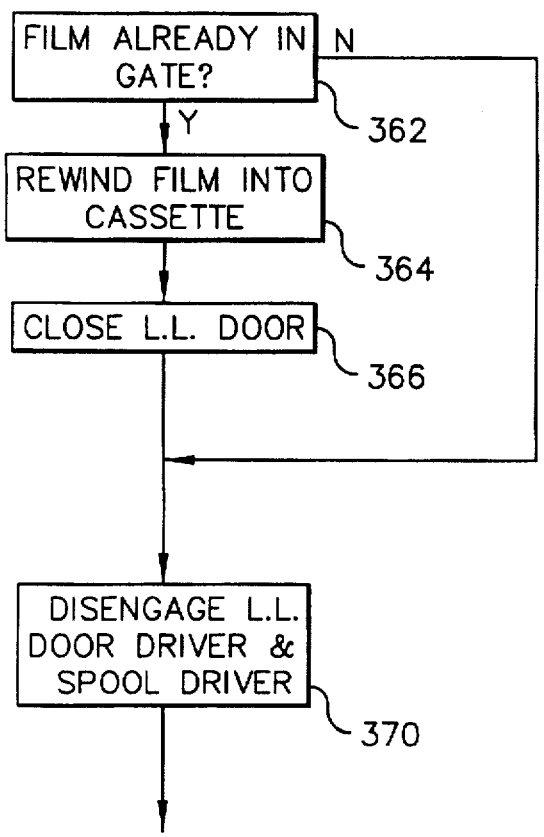
Figure 14F:
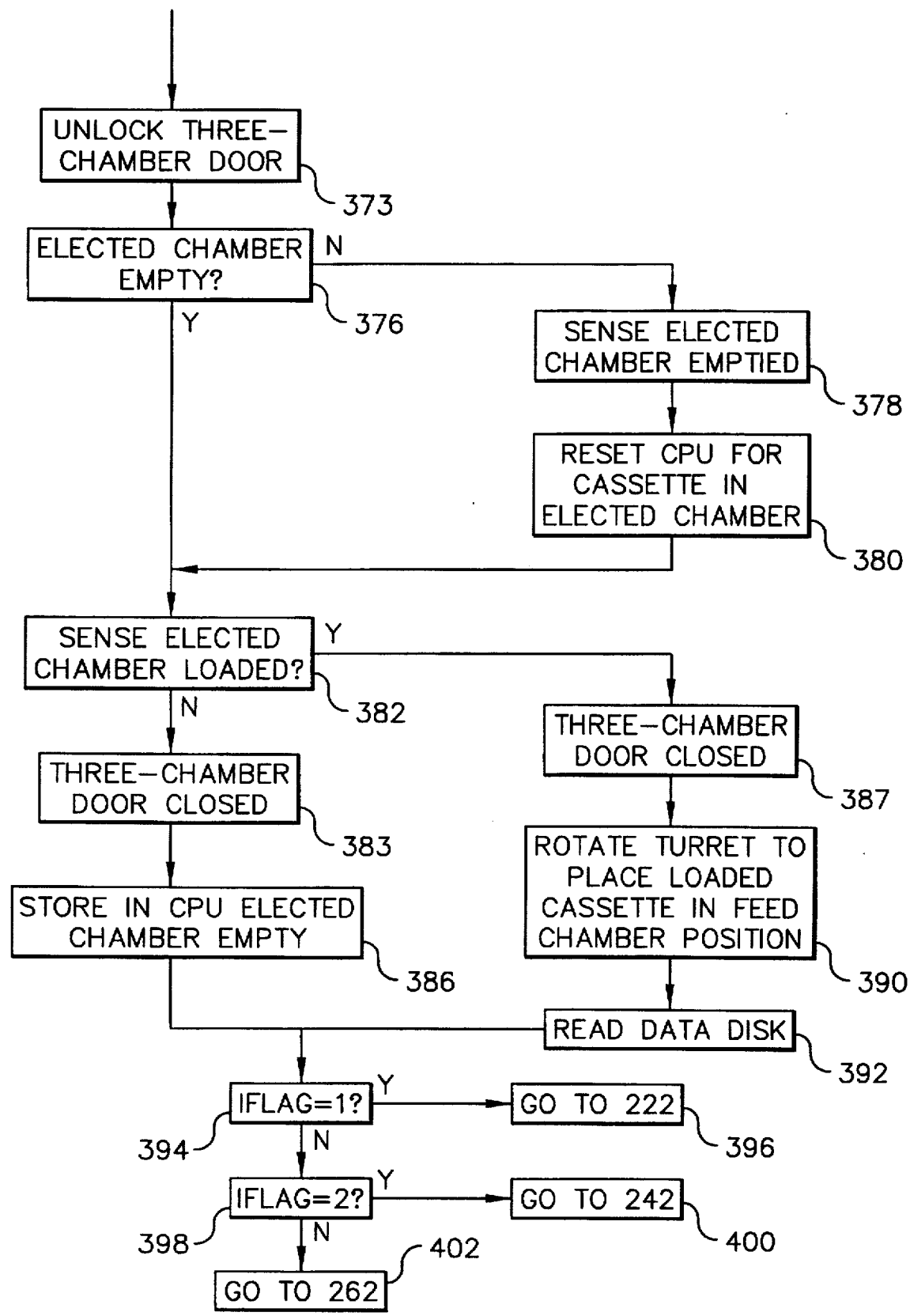

FIG. 12 is a perspective view similar to FIG. 11, showing cam 104 having raised pivot arm 100, disengaging the spool driver 94 and light lock driver 96 from the cassette in the feed chamber 42 so the turret 44 can be rotated.

One example of the operation of camera 20 shown in FIG. 4 will now be described with reference to the Flow Chart in FIG. 13. The operation of the camera in this example is governed by a microprocessor programmed with the priority that electronic flash is optional and can be used to reduce the frequency of film changes to faster ISO speed. If lighting conditions change such that the film type in the film gate requires electronic flash to receive proper exposure, then electronic flash is used and no film change is made. If the CPU determines that the film currently in the film gate cannot receive proper exposure with the aid of electronic flash and another chamber contains film of greater ISO speed, then the film change is made automatically. While the camera is turned off, at first turn on, and at power down, the spool centering pin, the light lock door driver, and the spool driver are all disengaged. Many aspects of the operation of an actual camera are not included in this flow chart as they are not relevant to describing the invention.

Referring to the Flow Chart in FIG. 13, it is understood that during operation of the camera, any one of the cassette chambers 38, 40, or 42 can be in the "load chamber" position. When the camera 20 is turned on, step 200, it performs a check of the status of the loading of the camera. It first performs a status check for chamber 38, step 202. The CPU 31 has stored in memory all prior exposures of the film in this chamber and thus knows which of the four paths 204, 214, 218, or 220 is appropriate. If chamber 38 is empty, path 204, the CPU directs the display to show "LOAD CASSETTE C1", step 206. If the chamber contains fully exposed and rewound film (light lock door has been closed), path 214, the CPU directs the display to show "REMOVE CASSETTE C1", step 216. In either case the CPU anticipates that a cassette will either be removed from or inserted into chamber 38 and senses when a load/unload button 95 (see FIG. 4) is depressed, step 208. Activation of the load/unload button causes the CPU to prepare for a cassette to be loaded or unloaded. If the load/unload button 95 is not depressed after a short duration, the CPU assumes the user is not ready to load/unload the camera and the logic continues to step 222. If the CPU knows that the film in chamber 38 is unexposed or partially exposed and has been rewound into the cassette, path 218, it will proceed to step 222. If the CPU knows that the film in chamber 38 is unexposed or partially exposed and still in the film gate, path 220, it will proceed to step 222. When the CPU senses that the load/ unload button 95 is depressed at step 208, the CPU sets the integer flag IFLAG=1, step 210, and the logic is directed at step 212 to go to step 360.

An identical logic flow for checking the status of film in chamber 40 is used in steps 222 to 240 and for checking the status of film in chamber 42 in steps 242 to 260, except that IFLAG=2 at step 230 and IFLAG=3 at step 250.

In the example shown in FIG. 4, having a single chamber door 52, the CPU 31 keeps track of full and empty cassette chambers by means of cassette sensor 97 located on plate 114, and by monitoring the movements of stepper motor 101 (See FIG. 11). As a cassette is inserted into a chamber, cassette sensor 97 informs the CPU 31 of cassette presence. Stepping motor 101 advances the chamber receiving the cassette in the turret 44 to the feed chamber position and the CPU 31 determines the position of the loaded/empty chamber by counting stepper motor pulses.

At step 360 the CPU determines if it is necessary to rotate the turret 44 for removing film from or loading film into the elected chamber. The elected chamber is the chamber that the CPU designated for loading or unloading according to the chamber status update described previously. If the elected chamber is already aligned with the single-chamber door, no rotation is required and the logic flows to step 374. If film is being removed from or loaded into a chamber that does not line up with the single-chamber door, then the CPU plans for turret rotation. First the CPU determines if film is already in the film gate, step 362. If so, the CPU directs the rewind of film into the feed cassette, step 364, and then the closing of the light lock door, step 366. If no film is in the film gate, logic flows to step 368. The spool centering pin is first disengaged at step 368, then the light lock door (L.L.) driver and spool driver are disengaged at step 370, by raising pivot arm 100. The turret is rotated by stepper motor 101 to move the elected chamber to align with the single-chamber door, step 372. The single-chamber door is then unlocked, step 374. At step 376, if the elected chamber is already empty, it will sense , by cassette sensor 97 located on plate 114, at step 382 when the elected chamber has been loaded. If at step 376 the elected chamber is ready to be emptied, then the CPU will sense, by cassette sensor 97, when the elected chamber has been emptied at step 378, then reset its memory for the status of the cassette in the elected chamber being removed, step 380, and advance to step 382. If the user chooses not to load film into the elected chamber at this time, the single-chamber door will be closed, step 384, and the CPU will store in memory that the elected chamber is empty, step 386. Otherwise, the elected chamber is loaded at step 382, the single-chamber door is closed, step 388, and the turret is rotated to place the loaded cassette in the feed chamber position, step 390. The data disk is then read, step 392. At step 394 if IFLAG=1, the logic returns at step 396 to step 222. If IFLAG=2 at step 398, the logic returns at step 400 to step 242, and if IFLAG=3, then the logic returns at step 402 to step 262.

After performing the status updates for all three chambers and allowing for fully exposed and rewound film to be removed and for new film to be loaded the logic flows to step 262. There is now either film in the gate or film is available for thrusting into the gate (assuming the camera is not completely empty of film and therefore not operable). If there is no film in the gate, the CPU determines if only one chamber is loaded, step 264. If so, the CPU will rotate (if necessary) the turret to place the only cassette in the feed chamber position, step 274. If only two chambers are loaded at step 266, the CPU will determine (step 272) if the films are of different speeds. If they are of different speeds, the CPU will rotate the turret to place the cassette with the faster ISO speed into the feed chamber position, step 276; if they are of the same ISO speed, the CPU will rotate the turret to place the first sequential cassette in the feed chamber position, step 278. If all three chambers are loaded, the CPU will determine (step 268) if any chamber is loaded with a cassette having an ISO speed of 400. If so, the CPU will rotate the turret to place the first sequential cassette with ISO 400 speed into the feed chamber position, step 270. If not, the CPU will determine if any chamber is loaded with a cassette having an ISO speed of 200, step 280. If so, the CPU will rotate the turret to place the first sequential cassette with ISO 200 speed into the feed chamber position, step 282. If not, the CPU will rotate the turret to place the first sequential cassette with ISO 100 speed into the feed chamber position, step 284. In all the preceding situations the logic flows next to step 286. At step 286 the CPU begins the process of loading film from the cassette presently in the feed chamber. The spool centering pin is engaged, step 286, the L.L. door driver and spool driver are engaged at step 288, then the L.L. door is opened, step 290, followed by thrusting film from the cassette in the feed chamber to the next unexposed frame, step 292, and the LCD display is updated to show the user the status of film in all three chambers, step 294. If at step 262 the CPU determines that there is film already in the film gate, then logic flows to step 294.

The camera of the present example is now ready for use with film from one of the cassettes loaded into the film gate and is waiting, step 298 for the photographer to partially depress the shutter button 107, step 296. When the shutter button 107 is partially depressed the camera takes a light reading of the subject, step 300. If the CPU determines that no other chamber is loaded with film at step 302, then the CPU determines if electronic flash is required, step 328. If there is a cassette in another chamber, but the CPU determines the film already loaded into the gate is the best or better choice for exposure with or without electronic flash, step 304, then the CPU next determines if electronic flash is required for use with this best or better choice of film, step 328. Exposure is made with electronic flash, steps 332 and 334, or without electronic flash, step 330. The number of frames exposed of the currently loaded cassette is then updated, step 336. If all frames of the current cassette have now been exposed, step 338, the film is rewound from the gate into the current cassette, step 346, the spool centering pin is disengaged, step 348, the L.L. door is closed, step 350, the L.L. door driver and spool driver are disengaged, step 352, and then the logic returns, step 354, back to step 202 of the flow chart. Returning to step 338, if all frames of the current cassette are not exposed, the film is advanced to the next frame, step 340, the LCD display is updated, step 342, and the logic flow returns, step 344, to step 296 for the next exposure. If at step 304 the film currently loaded in the film gate is not the best or better choice for exposure with or without electronic flash, then the CPU rewinds the film into the cassette in the feed chamber, step 306. Next, the spool centering pin is disengaged, step 308, the L.L. door is closed, step 310, the L.L. door driver and spool driver are disengaged, step 312, and the turret is rotated to move the selected cassette to the feed chamber position, step 314. The cassette has been selected based on criteria for optimizing the quality of the exposure. Next, the spool centering pin is engaged, step 316, the L.L. door driver and spool driver are engaged, step 318, the L.L. door is opened, step 320, the film from the selected cassette is thrust into the film gate to the next unexposed frame, step 322, the LCD display is updated, step 324, and finally the logic flows (step 326) back to step 296, where the camera is ready to take the next picture with a better film selection.

One example of the operation of camera 20 (with one three-chamber door) will now be described with reference to the Flow Chart in FIG. 14. The operation of the camera in this example is governed by a microprocessor programmed with the priority that electronic flash is optional and can be used to reduce the frequency of film changes to faster ISO speed. If lighting conditions change such that the current film in the gate requires electronic flash to receive proper exposure, then electronic flash is used and no film change is made. If the CPU determines that the film currently in the gate cannot receive proper exposure with the aid of electronic flash and another chamber contains film of greater ISO speed, then the film change is made automatically. While the camera is turned off, at first turn on, and at power down, the L.L. door driver and the spool driver are disengaged. It is noted that since the three-chamber door supports on a rotatable disk three spool centering pins, the operation of this camera is simpler than for a camera having one single-chamber door or two single-chamber doors that requires a mechanism for engaging and disengaging a spool centering pin for the feed chamber. Many aspects of the operation of an actual camera are not included in this flow chart as they are not relevant to describing the invention.

Referring to the Flow Chart in FIG. 14, when the camera 20 is turned on, step 200, it performs a check of the status of the loading of the camera. It first performs a status check for chamber 38. The CPU 31 has stored in memory all prior exposures of the film in this chamber and thus knows which of the four paths 204, 214, 218, or 220 is appropriate. If chamber 38 is empty, path 204, the CPU directs the display to show "LOAD CASSETTE C1", step 206. If the chamber contains fully exposed and rewound film (L.L. door has been closed), path 214, the CPU directs the display to show "REMOVE CASSETTE C1", step 216. In either case the CPU anticipates that a cassette will either be removed from or inserted into chamber 38 and senses when the load/unload button is depressed, step 208. If the load/unload button is not depressed after a short duration, the CPU assumes the user is not ready to load/unload the camera and the logic continues to step 222. If the CPU knows that the film in chamber 38 is unexposed or partially exposed and has been rewound into the cassette, path 218, it will proceed to step 222. If the CPU knows that the film in chamber 38 is unexposed or partially exposed and still in the film gate, path 220, it will proceed to step 222. When the CPU senses that the load/unload button is depressed at step 208, the CPU sets the integer flag IFLAG=1, step 210, and the logic is directed at step 211 to go to step 362.

An identical logic flow for checking the status of film in chamber 40 is used in steps 222 to 240 and for checking the status of film in chamber 42 in steps 242 to 260, except that IFLAG=2 at step 230 and IFLAG=3 at step 250.

At step 362 the CPU determines if film is already in the film gate. If so, the CPU directs the rewind of film into the feed cassette, step 364, and then the closing of the L.L. door, step 366. If no film is in the film gate, logic flows to step 370. The L.L. door driver and spool driver are disengaged at step 370. The three-chamber door is then unlocked, step 373. At step 376, if the elected chamber is already empty, it will sense, via cassette sensor 115 (FIG. 7) at step 382 when the elected chamber has been loaded. If at step 376 the elected chamber is ready to be emptied, then the CPU will sense when the elected chamber has been emptied via cassette sensor 115 at step 378, then reset its memory for the status of the cassette in the elected chamber being removed, step 380, and advance to step 382 to also sense when the elected chamber has been loaded. If the user chooses not to load film into the elected chamber at this time, the three-chamber door will be closed, step 383, and the CPU will store in memory that the elected chamber is empty, step 386. Otherwise, the elected chamber is loaded at step 380, the three-chamber door is closed, step 387, and, if necessary, the turret is rotated to place the loaded cassette in the feed chamber position, step 390. The data disk is then read, step 392. At step 394 if IFLAG=1, the logic returns at step 396 to step 222. If IFLAG=2 at step 398, the logic returns at step 400 to step 242, and if IFLAG=3, then the logic returns at step 402 to step 262.

After performing the status updates for all three chambers and allowing for fully exposed and rewound film to be removed and for new film to be loaded the logic flows to step 262. There is now either film in the gate or film is available for thrusting into the gate (assuming the camera is not completely empty of film and therefore not operable). If there is no film in the gate, the CPU determines if only one chamber is loaded, step 264. If so, the CPU will rotate (if necessary) the turret to place the only cassette in the feed chamber position, step 274. If only two chambers are loaded at step 266, the CPU will determine (step 272) if the films are of different speeds. If they are of different speeds, the CPU will rotate the turret to place the cassette with the faster ISO speed into the feed chamber position, step 276; if they are of the same ISO speed, the CPU will rotate the turret to place the first sequential cassette in the feed chamber position, step 278. If all three chambers are loaded, the CPU will determine (step 268) if any chamber is loaded with a cassette having an ISO speed of 400. If so, the CPU will rotate the turret to place the first sequential cassette with ISO 400 speed into the feed chamber position, step 270. If not, the CPU will determine if any chamber is loaded with a cassette having an ISO speed of 200, step 280. If so, the CPU will rotate the turret to place the first sequential cassette with ISO 200 speed into the feed chamber position, step 282. If not, the CPU will rotate the turret to place the first sequential cassette with ISO 100 speed into the feed chamber position, step 284. In all the preceding situations the logic flows next to step 288. At step 288 the CPU begins the process of loading film from the cassette presently in the feed chamber by engaging the L.L. door driver and spool driver. The L.L. door is opened, step 290, followed by thrusting film from the cassette in the feed chamber to the next unexposed frame, step 292, and then the LCD display is updated to show the user the status of film in all three chambers, step 294. If at step 262 the CPU determines that there is film already in the film gate, then logic flows to step 294.

The camera of the present example is now ready for use with film from one of the cassettes loaded into the film gate and is waiting, step 298 for the photographer to partially depress the shutter button, step 296. When the shutter button is partially depressed the camera takes a light reading of the subject, step 300. If the CPU determines that no other chamber is loaded with film at step 302, then the CPU determines if electronic flash is required, step 328. If there is a cassette in another chamber, but the CPU determines the film already loaded into the gate is the best or better choice for exposure with or without electronic flash, step 304, then the CPU next determines if electronic flash is required for use with this best or better choice of film, step 328. Exposure is made with electronic flash, steps 332 and 334, or without electronic flash, step 330. The number of frames exposed of the currently loaded cassette is then updated, step 336. If all frames of the current cassette have now been exposed, step 338, the film is rewound from the gate into the current cassette, step 346, the L.L. door is closed, step 350, the L.L. door driver and spool driver are disengaged, step 352, and then the logic returns, step 354, back to step 202 of the flow chart. Returning to step 338, if all frames of the current cassette are not exposed, the film is advanced to the next frame, step 340, the LCD display is updated, step 342, and the logic flow returns, step 344, to step 296 for the next exposure. If at step 304 the film currently loaded in the film gate is not the best or better choice for exposure with or without electronic flash, then the CPU rewinds the film into the cassette in the feed chamber, step 306. Next, the L.L. door is closed, step 310, the L.L. door driver and spool driver are disengaged, step 312, and the turret is rotated to move the selected cassette to the feed chamber position, step 314. The cassette has been selected based on criteria for optimizing the quality of the exposure. Next, the L.L. door driver and spool driver are engaged, step 318, the L.L. door is opened, step 320, the film from the selected cassette is thrust into the film gate to the next unexposed frame, step 322, the LCD display is updated, step 324, and finally the logic flows (step 326) back to step 296, where the camera is ready to take the next picture with a better film selection.

The invention has been described in detail with reference to a preferred embodiment; However, it will be appreciated that variations and modifications can be effected by a person of ordinary skill in the art without departing from the scope of the invention.

PARTS LIST

C1 cassette
C2 cassette
C3 cassette
12 film status indicators
14 light lock (L.L.) door
16 data disk
20 still picture camera
22 front of camera
23 objective lens
24 side of camera
25 shutter
26 underside of camera
28 turret housing
29 film perforation sensor
30 single three-chamber door
31 central processing unit (CPU)
38 cassette C1 chamber
40 cassette C2 chamber
42 cassette C3 chamber
43 data disk reader
44 revolving turret
45 chamber door lock
46 rotatable disk
47 door open/close sensor
48 spool centering pins
51 flash lamp
52 chamber 38 door
53 single-chamber door lock
54 LCD visual display
61 light tight baffle
63 door latch
64 chamber 40 door
65 door latch
66 film channel
68 film channel
70 film channel
72 film
74 film channel
75 film channel
76 film gate
78 spooling chamber
80 spur gear
82 turret gear
86 lever
87 solenoid
88 pivot 90 spool centering pin
92 camera back
94 spool driver
95 load/unload button
96 L.L. door driver
97 cassette sensor
98 transfer gear
100 pivot arm
101 turret motor
102 pivot
103 motor
104 cam
105 cam shaft
106 transfer gear
107 shutter button
108 motor driven gear
110 transfer gear
112 motor driven gear
113 drive motor
114 plate
115 cassette sensor
116 cassette sensor
117 cassette sensor
200 step, camera on/off sensing
201 step, power down mode
202 step, perform chamber 38 status update
204 path, chamber 38 empty condition
206 step, display "LOAD CASSETTE C1"
208 step, CPU decision: load/unload button depressed? Y or N
210 step, CPU sets IFLAG=1
211 step, go to step 362
212 step, go to step 360
214 path, film fully exposed & rewound and L.L. door closed condition
216 step, display "REMOVE CASSETTE C1"
218 path, film unexposed or partially exposed and rewound, ISO film speed and frames exposed stored in CPU
220 path, film unexposed or partially exposed and still in film gate, ISOfilm speed and frames exposed stored in CPU
222 step, perform chamber 40 status update
224 path, chamber 40 empty condition
226 step, display "LOAD CASSETTE C2"
228 step, CPU decision: load/unload button depressed? Y or N
230 step, CPU sets IFLAG=2
231 step, go to step 362
232 step, go to step 360
234 path, film fully exposed & rewound and L.L. door closed condition
236 step, display "REMOVE CASSETTE C2"
238 path, film unexposed or partially exposed and rewound, ISO film speed and frames exposed stored in CPU
240 path, film unexposed or partially exposed and still in film gate, ISOfilm speed and frames exposed stored in CPU
242 step, perform chamber 42 status update
244 path, chamber 42 empty condition
246 step, display "LOAD CASSETTE C3"
248 step, CPU decision: load/unload button depressed? Y or N
250 step, CPU sets IFLAG=3
251 step, go to step 362
252 step, go to step 360
254 path, film fully exposed & rewound and L.L. door closed condition
256 step, display "REMOVE CASSETTE C3"
258 path, film unexposed or partially exposed and rewound, ISO film speed and frames exposed stored in CPU
260 path, film unexposed or partially exposed and still in film gate, ISOfilm speed and frames exposed stored in CPU
262 step, CPU decision: film already in film gate? Y or N
264 step, CPU decision: only one chamber loaded? Y or N
266 step, CPU decision: only two chambers loaded? Y or N
268 step, CPU determines if cassette with ISO 400 in any chamber
270 step, CPU rotates turret to place first sequential ISO 400 cassette in feed chamber position
272 step, CPU determines if two cassettes have different ISO speed
274 step, CPU rotates turret to place only cassette in feed chamber position
276 step, CPU rotates turret to place cassette with faster ISO speed in feed chamber position
278 step, CPU rotates turret to place first sequential cassette in feed chamber position
280 step, CPU determines if cassette with ISO 200 in any chamber
282 step, CPU rotates turret to place first sequential ISO 200 cassette in feed chamber position
284 step, CPU rotates turret to place first sequential ISO 100 cassette in feed chamber position
286 step, CPU engages spool centering pin
288 step, CPU engages L.L. door driver and spool driver
290 step, CPU opens L.L. door
292 step, CPU thrusts film from cassette in feed chamber to next unexposed frame
294 step, CPU updates display of film cassette status for all chambers
296 step, CPU decision: shutter button partially depressed? Y or N
298 step, CPU waits until shutter button partially depressed
300 step, take subject light reading
302 step, CPU decision: is another chamber loaded with film? Y or N
304 step, CPU decision: is film in gate best or better choice for exposure with or without electronic flash? Y or N
306 step, CPU rewinds film into cassette in feed chamber
308 step, CPU disengages spool centering pin
310 step, CPU closes L.L. door of cassette in feed chamber
312 step, CPU disengages L.L. door driver and spool driver
314 step, CPU rotates turret to move selected cassette to feed chamber position
316 step, CPU engages spool centering pin
318 step, CPU engages L.L. door driver and spool driver
320 step, CPU opens L.L. door
322 step, CPU thrusts film from cassette in feed chamber to next unexposed frame
324 step, CPU updates display of film cassette status for all chambers
326 step, go to step 296
328 step, CPU decision: electronic flash required? Y or N
330 step, CPU exposes film without electronic flash
332 step, CPU activates electronic flash circuitry
334 step, CPU exposes film with electronic flash
336 step, CPU updates frames exposed of currently exposed cassette
338 step, CPU decision: all frames exposed in current cassette? Y or N
340 step, CPU advances film to next frame
342 step, CPU updates display of frames exposed of currently exposed cassette 344 step, go to step 296
346 step, CPU rewinds film into cassette
348 step, CPU disengages spool centering pin
350 step, CPU closes L.L. door
352 step, CPU disengages L.L. door driver and spool driver
354 step, go to 202
360 step, CPU decision: turret rotation required? Y or N
362 step, CPU decision: film already in film gate? Y or N
364 step, CPU rewinds film into feed cassette
366 step, CPU closes L.L. door
368 step, CPU disengages spool centering pin
370 step, CPU disengages L.L. door driver and spool driver
372 step, CPU rotates turret to move elected chamber to align with single-chamber door
373 step, CPU unlocks three-chamber door
374 step, CPU unlocks single-chamber door
376 step, CPU decision: selected chamber empty? Y or N
378 step, CPU senses cassette has been removed from elected chamber
380 step, CPU resets memory for cassette in elected chamber after being emptied
382 step, CPU decision: sense elected chamber loaded? Y or N
383 step, three-chamber door closed without accepting film
384 step, single-chamber door closed without accepting film
386 step, CPU stores in memory that elected chamber is empty
387 step, CPU determines elected chamber loaded and locks three-chamber door
388 step, CPU determines elected chamber loaded and locks single-chamber door
390 step, CPU rotates turret to place loaded cassette in feed chamber position
392 step, CPU reads data disk of cassette in feed chamber
394 step, CPU decision: IFLAG=1? Y or N
396 step, CPU goes to step 222
398 step, CPU decision: IFLAG=2? Y or N
400 step, CPU goes to step 242
402 step, CPU goes to 262

What is claimed is:

1. A still picture camera for capturing images on photographic film contained in film cassettes of the type wherein film can be thrust from the cassette and returned to the cassette repeatedly by a camera mechanism, the camera comprising:

(a) a camera body;

(b) a film gate in the camera body for defining the area of exposure of one frame of film;

(c) an objective lens mounted on the camera body for forming an image on a film located in the film gate;

(d) a shutter for controlling the admission of light to the film;

(e) a turret having a plurality of film cassette chambers for accepting film cassettes;

(f) a film drive mechanism for advancing film from or rewinding film into a film cassette located in an adjacent film cassette chamber;

(g) a turret drive mechanism for indexing the turret so that respective ones of the film cassette chambers are located adjacent the film drive mechanism; and (h) a film spooling chamber for receiving film from a film cassette located in the adjacent film cassette chamber, whereby the film from any one of the plurality of film cassettes may be advanced past the film gate and into the film spooling chamber for exposure in the film gate.

2. The still picture camera claimed in claim 1, further comprising: a central processing unit (CPU) for controlling the operation of the camera, including the turret drive mechanism and the film drive mechanism.

3. The still picture camera claimed in claim 2 for use with a film cassette of the type having a light lock adapted to be driven by a light lock driver, wherein the film drive mechanism further comprises:

(a) a light lock door driver;

(b) a film spool driver; and (c) a movable two-position arm supporting the light lock door driver and the film spool driver, the arm being moveable, under control of the CPU, from a position of disengagement to a position of engagement with a film cassette located in the adjacent film cassette chamber to enable sequentially opening the light lock door of a film cassette, thrusting film from the opened film cassette, rewinding film back into the opened film cassette, and closing the light lock door of the film cassette.

4. The still picture camera claimed in claim 3 further comprising a motor driven cam for positioning the two position arm for said light lock door driver and film spool driver.

5. The still picture camera claimed in claim 4, wherein the turret defines three film cassette chambers.

6. The still picture camera claimed in claim 5, further comprising a chamber door that can be opened to provide simultaneous access to all three film cassette chambers, and when closed provides a light tight enclosure for the film cassette chambers, the chamber door including three cassette center pins mounted on a disk that is rotatable with the turret.

7. The still picture camera claimed in claim 5, further comprising:

(a) a chamber door that can be opened to provide access to one of the three film cassette chambers that is not adjacent the film drive mechanism, and when closed, provides a light tight enclosure for the film cassette chambers;

(b) a cassette centering pin mounted on a moveable arm and moveable between a first position wherein the pin is engaged with a film cassette located in the film cassette chamber adjacent the film drive mechanism and a second position wherein the pin is removed from the film cassette to allow the turret to be rotated;

(c) means in the camera body for providing a light tight enclosure for the film cassette chamber adjacent the film advance mechanism when a chamber door is open.

8. The still picture camera claimed in claim 7, further comprising:

(a) a second chamber door for providing access to another film cassette chamber.

9. The still picture camera claimed in claim 6 for use with film cassettes of the type having a light lock adapted to be driven by a light lock driver, further comprising:

(a) a film perforation sensor located at the film gate for sensing film perforations, the film perforation sensor being connected to the CPU for informing the CPU when a film perforation passes the sensor;

(b) a film cassette data disk reader located adjacent the film drive mechanism and being connected to the CPU for informing the CPU of film cassette ISO film speed and number of available exposures in the cassette;

(c) a film chamber door lock for locking and unlocking the film chamber door under control of the CPU;

(d) a film chamber door open/closed sensor for signaling to the CPU when the film chamber door is open or closed;

17

(e) three film cassette presence sensor located in respective film cassette chambers connected to the CPU for informing the CPU of the presence of a film cassette in one or more of the film cassette chambers; and (f) means in the CPU for controlling the film chamber door lock and film cassette light lock drivers in response to inputs received from the film perforation sensor, the film cassette data disk readers, and the door open closed sensors.

10. The still picture camera claimed in claim 2, further comprising an electronic flash lamp connected to the CPU for automatic control.

11. The still picture camera claimed in claim 10 wherein the CPU is programmed to automatically change film according to either or all of the criteria of film availability, lighting conditions, choice of electronic flash, and a user programmed priority.

12. The still picture camera claimed in claim 10 wherein the CPU is programmed to operate the camera and select film from cassettes in the film cassette chambers with a priority of minimum use of electronic flash.

13. The still picture camera claimed in claim 10 wherein the CPU is programmed to operate the camera and select film from cassettes in the film cassette chambers with a priority of minimal film changes with use of electronic flash as an option.

14. The still picture camera claimed in claim 10 wherein the CPU is programmed to operate the camera and select film from cassettes in the film cassette chambers with a priority of obtaining better image quality without electronic flash.

15. The still picture camera claimed in claim 10 wherein the CPU is programmed to operate the camera and select film cassettes in the film cassette chambers with a priority of obtaining better image quality with electronic flash as an option.

16. The still picture camera claimed in claim 2, further comprising a visual display connected to the CPU for displaying the operating status of the camera.

17. The still picture camera claimed in claim 1, wherein the rotatable turret is located to a first side of the film gate in the camera body, and the film spooling chamber is located to a second side of the film gate opposite to said first side.

18. A method for capturing images on photographic film contained in film cassettes of the type wherein film can be thrust from the cassette and returned to the cassette repeatedly by a camera mechanism, comprising the steps of:

(a) providing a camera body;

(b) providing a film gate in the camera body for defining the area of exposure of one frame of film;

(c) providing an objective lens mounted on the camera body for forming an image on a film located in the film gate;

(d) providing a shutter for controlling the admission of light to the film;

(e) providing a turret having a plurality of film cassette chambers for accepting film cassettes;

(f) providing a film drive mechanism for advancing film from or rewinding film into a film cassette located in an adjacent film cassette chamber;

(g) providing a turret drive mechanism for indexing the turret so that respective ones of the film cassette chambers are located adjacent the film drive mechanism;

(h) providing a film spooling chamber for receiving film from a film cassette located in the adjacent film cassette

18 chamber, whereby the film from any one of the plurality of film cassettes may be advanced past the film gate and into the film spooling chamber for exposure in the film gate;

(i) loading the camera with a plurality of different type of film;

(j) operating the camera under different photographic conditions and selecting the film type appropriate to the photographic conditions.

19. The method of capturing photographic images claimed in claim 18, further comprising the step of providing a central processing unit (CPU) for controlling the operation of the camera, including the turret drive mechanism and the film drive mechanism.

20. The method of capturing photographic images claimed in claim 19 for use with a film cassette of the type having a light lock adapted to be driven by a light lock driver, further comprising the steps of:

(a) providing a light lock door driver;

(b) providing a film spool driver; and (c) providing a movable two-position arm supporting the light lock door driver and the film spool driver, the arm being moveable, under control of the CPU, from a position of disengagement to a position of engagement with a film cassette located in the adjacent film cassette chamber to enable sequentially opening the light lock door of a film cassette, thrusting film from the opened film cassette, rewinding film back into the opened film cassette, and closing the light lock door of the film cassette.

21. The method of capturing a photographic image claimed in claim 20, further comprising the step of providing a chamber door that can be opened to provide simultaneous access to all three film cassette chambers, and when closed provides a light tight enclosure for the film cassette chambers, the chamber door including three cassette center pins mounted on a disk that is rotatable with the turret.

22. The method of capturing a photographic image claimed in claim 21, further comprising the steps of:

(a) providing a chamber door that can be opened to provide access to one of the three film cassette chambers that is not adjacent the film drive mechanism, and when closed, provides a light tight enclosure for the film cassette chambers;

(b) providing a cassette centering pin mounted on a moveable arm and moveable between a first position wherein the pin is engaged with a film cassette located in the film cassette chamber adjacent the film drive mechanism and a second position wherein the pin is removed from the film cassette to allow the turret to be rotated;

(c) providing means in the camera body for providing a light tight enclosure for the film cassette chamber adjacent the film advance mechanism when a chamber door is open.

23. The method of capturing a photographic image claimed in claim 22, further comprising the steps of:

(a) a second chamber door for providing access to another film cassette chamber.

24. The method of capturing a photographic image claimed in claim 21 for use with film cassettes of the type having a light lock adapted to be driven by a light lock driver, further comprising the steps of:

(a) providing a film perforation sensor located at the film gate for sensing film perforations, the film perforation sensor being connected to the CPU for informing the CPU when a film perforation passes the sensor;

(b) providing a film cassette data disk reader located adjacent the film drive mechanism and being connected to the CPU for informing the CPU of film cassette ISO film speed and number of available exposures in the cassette;

(c) providing a film chamber door lock for locking and unlocking the film chamber door under control of the CPU;

(d) providing a film chamber door open/closed sensor for signaling to the CPU when the film chamber door is open or closed;

(e) providing three film cassette presence sensor located in respective film cassette chambers connected to the CPU for informing the CPU of the presence of a film cassette in one or more of the film cassette chambers; and (f) providing means in the CPU for controlling the film chamber door lock and film cassette light lock drivers in response to inputs received from the film perforation sensor, the film cassette data disk readers, and the film chamber door open/closed sensors.

25. The method of capturing a photographic image claimed in claim 19, further comprising the step of providing an electronic flash lamp connected to the CPU for automatic control.

26. The method of capturing a photographic image claimed in claim 25 wherein the CPU is programmed to automatically change film according to either or all of the criteria of film availability, lighting conditions, choice of electronic flash, and a user programmed priority.

27. The method of capturing a photographic image claimed in claim 25 wherein the CPU is programmed to operate the camera and select film from cassettes in the film cassette chambers with a priority of minimum use of electronic flash.

28. The method of capturing a photographic image claimed in claim 25 wherein the CPU is programmed to operate the camera and select film from cassettes in the film cassette chambers with a priority of minimal film changes with use of electronic flash as an option.

29. The method of capturing a photographic image claimed in claim 25 wherein the CPU is programmed to operate the camera and select film from cassettes in the film cassette chambers with a priority of obtaining better image quality without electronic flash.

30. The method of capturing a photographic image claimed in claim 25 wherein the CPU is programmed to operate the camera and select film cassettes in the film cassette chambers with a priority of obtaining better image quality with electronic flash as an option.

31. The method of capturing a photographic image claimed in claim 19, further comprising the step of providing a visual display connected to the CPU for displaying the operating status of the camera.

32. The still picture camera claimed in claim 9, wherein the CPU is programmed to count the perforations of film from each cassette and keep track of where to position the film from the cassettes in the camera in the gate such that no frames are double exposed or unexposed.

33. The method claimed in claim 24, further comprising the step of counting the film frames in the CPU from each cassette that pass the perforation detector and keeping track of when to position the film from the cassettes in the camera at the film gate such that no frames are double exposed or unexposed.

* * * * *